United States Patent
Sun et al.

(10) Patent No.: US 11,913,118 B2
(45) Date of Patent: Feb. 27, 2024

(54) ZINC ALLOY COATED PRESS-HARDENABLE STEELS AND METHOD OF MANUFACTURING THE SAME

(71) Applicants: NUCOR CORPORATION, Charlotte, NC (US); TECK METALS LTD., Vancouver (CA)

(72) Inventors: Weiping Sun, Charlotte, NC (US); Nan Gao, Vancouver (CA); Yihui Liu, Vancouver (CA)

(73) Assignees: NUCOR CORPORATION, Charlotte, NC (US); TECK METALS LTD., Vancouver (CA)

(*) Notice: Subject to any disclaimer, the term of this patent is extended or adjusted under 35 U.S.C. 154(b) by 506 days.

(21) Appl. No.: 16/462,883

(22) PCT Filed: Feb. 28, 2019

(86) PCT No.: PCT/US2019/020153
§ 371 (c)(1),
(2) Date: May 21, 2019

(87) PCT Pub. No.: WO2019/169198
PCT Pub. Date: Sep. 6, 2019

(65) Prior Publication Data
US 2021/0108300 A1 Apr. 15, 2021

Related U.S. Application Data

(60) Provisional application No. 62/637,092, filed on Mar. 1, 2018.

(51) Int. Cl.
*C23C 2/06* (2006.01)
*C21D 9/52* (2006.01)
(Continued)

(52) U.S. Cl.
CPC .............. *C23C 2/06* (2013.01); *B32B 15/013* (2013.01); *C21D 1/673* (2013.01); *C21D 8/0226* (2013.01);
(Continued)

(58) Field of Classification Search
CPC .... C23C 2/06; C23C 2/28; C23C 2/40; B32B 15/013; C21D 1/673; C21D 8/0226;
(Continued)

(56) References Cited

U.S. PATENT DOCUMENTS 5,695,822 A * 12/1997 Carey, II ................. C23C 30/00
427/329
6,562,474 B1 5/2003 Yoshimi et al.
(Continued)

FOREIGN PATENT DOCUMENTS

CA 2850332 A1 4/2013
CN 104099550 A * 10/2014
(Continued)

OTHER PUBLICATIONS

Lee, Liquid-Metal-Induced Embrittlement of Zn-Coated Hot Stamping Steel, metallurgical and materials transactions a, 43a, p. 5122-5127 (Year: 2012).*

(Continued)

*Primary Examiner* — Anthony M Liang
(74) *Attorney, Agent, or Firm* — Christopher J. Knors; Moore & Van Allen PLLC

(57) ABSTRACT

The present disclosure relates to coated steel strip providing the steel with cathodic protection before and after the steel is press hardened or hot formed at a high austenitization temperature up to 950° C. The coating of the coated steel strip comprises zinc, aluminum, and at least one element selected from manganese (Mn) and/or antimony (Sb).

15 Claims, 14 Drawing Sheets

(51) Int. Cl.

| | |
|---|---|
| *C21D 8/02* | (2006.01) |
| *C23C 2/28* | (2006.01) |
| *C21D 1/673* | (2006.01) |
| *C23C 2/40* | (2006.01) |
| *C22C 18/04* | (2006.01) |
| *B32B 15/01* | (2006.01) |
| *C23C 2/26* | (2006.01) |

(52) U.S. Cl.
CPC ......... *C21D 8/0236* (2013.01); *C21D 8/0263* (2013.01); *C21D 9/52* (2013.01); *C22C 18/04* (2013.01); *C23C 2/26* (2013.01); *C23C 2/28* (2013.01); *C23C 2/29* (2022.08); *C23C 2/40* (2013.01)

(58) Field of Classification Search
CPC ...... C21D 8/0236; C21D 8/0263; C21D 9/52; C22C 18/04
See application file for complete search history.

(56) References Cited

U.S. PATENT DOCUMENTS

| | | | |
|---|---|---|---|
| 2003/0089432 A1 | 5/2003 | Carey, II et al. | |
| 2007/0256808 A1* | 11/2007 | Fleischanderl | C25D 5/48 164/72 |
| 2009/0098408 A1 | 4/2009 | Sun | |
| 2011/0139317 A1 | 6/2011 | Taniguchi et al. | |
| 2011/0284136 A1 | 11/2011 | Kurosaki et al. | |
| 2014/0170438 A1 | 6/2014 | Baumgart et al. | |
| 2014/0212684 A1 | 7/2014 | Kawata et al. | |
| 2014/0234658 A1 | 8/2014 | Nozaki et al. | |
| 2014/0342181 A1* | 11/2014 | Mutschler | C21D 1/26 148/533 |
| 2015/0191077 A1* | 7/2015 | Allely | B60J 5/0483 156/60 |
| 2015/0314568 A1* | 11/2015 | Takahashi | C22C 38/22 428/659 |
| 2016/0215376 A1 | 7/2016 | Luther et al. | |
| 2018/0258514 A1 | 9/2018 | Oka et al. | |
| 2019/0194792 A1* | 6/2019 | Kim | C22C 18/04 |
| 2021/0180172 A1* | 6/2021 | Speer | C23C 2/40 |

FOREIGN PATENT DOCUMENTS

| | | |
|---|---|---|
| CN | 104099550 A | 10/2014 |
| JP | 56108847 A | 8/1981 |
| JP | 57067153 A | 4/1982 |
| JP | 07216526 A | 8/1995 |
| JP | 2013189671 A | 9/2013 |
| KR | 960006049 B1 | 5/1996 |
| KR | 101786377 B1 | 10/2017 |
| KR | 101819393 B1 | 1/2018 |
| WO | 2018085672 A1 | 5/2018 |

OTHER PUBLICATIONS

ISA/US, International Search Report and Written Opinion for International Application No. PCT/US2020/015621, dated Apr. 22, 2020, 8 pages.

International Bureau; International Application No. PCT/US2019/020153, International Preliminary Report on Patentability, dated Sep. 10, 2020.

Lee, Chang Wook, et al.; "Liquid-Metal-Induced Embrittlement of Zn-Coated Hot Stamping Steel," Metallurgical and Materials Transactions A, 2012, pp. 5122-5127, vol. 43A.

ISA/US; International Search Report and Written Opinion for International Application No. PCT/US2019/020153 dated May 1, 2019, 12 Pages.

Kawagushi et al., The Physical Metallurgy of Zinc Coated Steel, edited by A.R. Marder, The Minerals, Metals & Materials Society, 1993, pp. 153-167.

Yang, Honglin, et al.; Effect of strip entry temperature on the formation of interfacial layer during hot-dip galvanizing of press-hardened steel, Surface & Coatings Technology, 2014, pp. 269-274, vol. 240, XP028829949.

European Patent Office; Partial Supplementary European Search Report for European Patent Application No. 19759954.1 dated Aug. 19, 2021, 15 Pages.

European Patent Office; Extended European Search Report for European Patent Application No. 19759954.1 dated Nov. 19, 2021, 11 Pages.

International Bureau, International Application No. PCT/US2019/020154, International Preliminary Report on Patentability, dated Sep. 10, 2020.

ISA/US; International Search Report & Written Opinion for International Application No. PCT/US2019/020154 dated May 10, 2019, 11 Pages.

European Patent Office; Extended European Search Report for European Patent Application No. 19706766.6 dated Oct. 19, 2021, 16 Pages.

USPTO; International Preliminary Report on Patentability for International Patent Application No. PCT/US2020/015621 dated Aug. 11, 2022, 6 Pages.

* cited by examiner

ZINC ALLOY COATED PRESS-HARDENABLE STEELS AND METHOD OF MANUFACTURING THE SAME

CROSS-REFERENCE TO RELATED APPLICATIONS

This application is a 35 U.S.C. § 371 National Stage Application of International Application No. PCT/US19/20153, filed Feb. 28, 2019, which claims the benefit of U.S. Provisional Application No. 62/637,092 filed on Mar. 1, 2018, the entirety of each of which is incorporated herein by reference.

TECHNICAL FIELD

The present disclosure relates to a zinc-based alloy coated steel substrate or sheet and methods of providing cathodic protection to a press-hardenable part formed therefrom. In particular, the zinc-based alloy coated press-hardenable steel (PHS) surface is hot formed.

BACKGROUND

Since the early 2000's, the usage of PHS in the manufacture of lightweight vehicles has significantly increased. A great advantage of the press-hardening technology (also referred to as "hot stamping" or "hot press forming") is its ability to produce complicated structural components with ultrahigh strength while avoiding issues caused by cold forming high-strength steels, such as increased springback and dimensional inaccuracy. There are two press-hardening methods: the direct press-hardening method and the indirect press-hardening method. In the direct press-hardening process, a blank of PHS is austenitized at a temperature above 850° C. for 3-10 min, and subsequently pressed and quenched at a rapid cooling rate (>25° C./s) to attain martensitic transformation. The indirect process includes a cold preforming step prior to the austenitization treatment. This preforming step reduces the amount of high temperature deformation, thus mitigating the cracking problem.

Current requirements for PHS are that its surface coating be able to prevent the steel from oxidation and decarburization during hot stamping/hot press forming, and able to provide press-hardened parts with corrosion protection in service. Various coatings and coating systems have been developed for PHS applications to meet these requirements. Of these coatings, an aluminum or aluminized coating is used, which consists of either pure aluminum (Type II) or aluminum with 7 wt. %-10 wt. % Si (Type I). However, such aluminized coatings are only able to provide a steel substrate with barrier protection. A shortcoming of this type of protection is that once the barrier coating is damaged or develops pores, the exposed areas of the steel substrate could be attacked with no further protection. After hot stamping/hot press forming, coating cracks and break-offs are often observed in such aluminized coatings due to the coating brittleness. Weldability and paintability of aluminized coatings are also generally poor after hot stamping/hot press forming.

Galvanized (GI) and galvannealed (GA) coatings have long been an excellent corrosion protection choice for automotive steel parts. These zinc-based coatings are able to offer cathodic protection to the steel substrate, thus possessing a great advantage in cut-edge protection. Moreover, conventional GI and GA coatings that are produced on continuous galvanizing lines (CGL) can readily retain the capability of cathodic protection even after experiencing a high temperature stamping process, however, zinc-coated PHS is generally limited to the indirect press-hardening or high temperature stamping process that is more time-consuming and requires additional equipment, thus increasing costs.

Thus, there remains a technical challenge of a direct-hardening process for zinc-coated PHS. The technical challenge with the direct-hardening process for zinc-coated PHS is twofold: zinc evaporation and micro-cracking. Since PHS blanks must be heated to an austenitization temperature above or close to the boiling temperature of zinc (906° C.) prior to stamping, zinc evaporation during hot stamping/hot press forming occurs. To suppress this zinc evaporation, one conventional approach is to apply a barrier layer onto the top of the zinc-based coating. The barrier layers can include silicone resin film (Japanese Patent Publication 2007-06378), zinc oxide (U.S. Pat. No. 7,673,485B2) and hexavalent chromium-containing overlay (US 2012/018437A1), for example. Applying a barrier layer onto a zinc-based coating results in a significant increase in cost and possibly gaseous hazards generated from the barrier layer during the hot-stamping process.

Another approach to curbing zinc evaporation is alloying the zinc coating with oxygen-affine elements. U.S. Pat. No. 8,021,497B2 relates to a method for producing a hardened steel part having cathodic corrosion protection. As per the patent, the cathodic protection is enabled by a zinc-based coating which is produced through a continuous coating process, either hot-dip galvanizing or an electrolytic process, with additions of one or more oxygen-affine elements including Mg, Si, Ti, Ca, Al and/or Mn in a total quantity of 0.1 wt. % to 15 wt. %. The purpose of adding one or more oxygen-affine elements is to form surface oxide, thereby suppressing zinc evaporation. However, it should be pointed out that the addition of Al to the zinc bath (typically ranging from 0.11 wt. % to 0.25 wt. %) is a common practice in continuous galvanizing production. During the hot dipping, the bath Al reacts with the steel strip to form a thin $Fe_2Al_5Zn_x$ intermetallic layer. This intermetallic layer restrains the development of a brittle Fe—Zn intermetallic, thus enhancing coating adherence and formability. As a result, there is always a small amount of Al in conventional GI or GA coatings. During the hot stamping/hot press forming of a galvanized or galvannealed PHS, the Al in the coating would be oxidized into $Al_2O_3$ which acts as a protective layer to suppress zinc evaporation.

Manganese is another oxygen-affine element listed in U.S. Pat. No. 8,021,497B2, and it is also considered to play the same role as Al in suppressing zinc evaporation. In fact, manganese oxide is commonly present on the surfaces of press-hardened steel parts which have been previously galvanized or galvannealed (without any addition of Mn in the bath). Manganese comes from the press-hardenable steel substrate which typically contains 1.0 wt. %-1.5 wt. % Mn. During the austenitization treatment, Mn in the steel substrate diffuses into the zinc coating and is subsequently oxidized into manganese oxide which coexists with $Al_2O_3$ on the surface of hot press formed parts.

In addition to the above elements from the bath and/or from the steel substrate, part of the zinc in the coating is oxidized into ZnO which, along with aluminum oxide and manganese oxide, acts as a barrier to suppress zinc evaporation. In effect, a sufficient surface oxide layer is always formed on conventional GI/GA coatings as long as there is a sufficient amount of oxygen in the atmosphere.

Compared to zinc evaporation, micro-cracking is a far more severe issue that limits the practical application of galvanized coatings in the direct press-hardening of PHS. This issue results from so-called liquid metal induced embrittlement (LMIE) or liquid metal embrittlement (LME) (hereinafter LMIE and LME are used interchangeably), as is also observed in the welding of non-PHS and other grades of advanced high-strength steel. It is generally understood that zinc coated steel after experiencing a high temperature stamping process or a press hardening process provides a coating that contains surface oxides (ZnO and $Al_2O_3$), a $\Gamma$ phase (Zn—Fe intermetallic phase) and $\alpha$ (Fe, Zn) phase. The $\Gamma$ phase contains about 70 wt. % Zn and transforms from a zinc-rich liquid phase. The $\alpha$ (Fe, Zn) phase typically contains 20 wt. % to 40 wt. % Zn. The resultant coating having zinc in these $\Gamma$ and $\alpha$ (Fe, Zn) phases provides the cathodic protection to the steel substrate. The melting point of zinc is only about 420° C. During the austenitization treatment (>850° C.), the zinc-based coating inevitably becomes molten. Under stress-applied conditions (i.e. stamping conditions), the zinc-rich liquid promotes the formation and propagation of micro-cracks in the steel substrate, more likely along the grain boundaries of the steel. After being hot press formed, the zinc-rich liquid phase is present in the resultant coating as $\Gamma$ phase which is readily distinguished from $\alpha$ (Fe, Zn) using conventional metallurgical techniques. However, the zinc-rich liquid (as $\Gamma$ phase after solidification) formed in conventional GI and GA coatings during the austenitization treatment is most likely a main cause of LMIE, which promotes the inception and propagation of micro-cracks in the steel substrate. For example, a zinc-rich $\Gamma$ phase was prevalent in the example coatings described in U.S. Pat. No. 8,021,497B2 as revealed in the images of the coating microstructures.

To overcome the cracking issue, one approach attempted was to minimize the portion of zinc-rich liquid in the resultant coating. Based on this approach, zinc is partially replaced with one or more alloying elements to result in a zinc alloy coating with a high solid-liquid transformation temperature (i.e. melting point). An example of such an approach is disclosed in U.S. Pat. No. 5,266,182 where a zinc alloy coating is provided containing at least 10 wt. % nickel (Ni). The Zn—Ni alloy coating is believed to consist mostly of a $\Gamma$-$Zn_{21}Ni_5$ phase. This intermetallic phase has a high melting point (880° C.) close to austenitization temperature so that the formation of liquid phase can be significantly reduced during the hot stamping/hot press forming. The introduction of that much nickel to a zinc bath greatly increases costs. A high nickel concentration also leads to the formation of a significant amount of dross at a typical galvanizing temperature, thus making it extremely difficult to produce the coating using the mainstream hot-dip galvanizing process.

Another approach to resolving the cracking issue is disclosed in US Patent Application 2014/0170438 A1 where a zinc alloy coating containing a very high concentration of manganese (Mn), for example at least 5 wt. % Mn, is provided. This patent application discloses that such a high amount of Mn addition in Zn would substantially increase the alloy melting point, thereby averting the issue of LMIE. However, due to the requirement for such high alloying additions of Mn, this coating can only be produced by an electrolytic process rather than by a continuous hot-dip process employing molten metals. Electrolytic coating production is generally more costly than continuous galvanizing production, and in addition, extra expense is incurred as a result of high alloying additions. For at least these reasons, the number of electro-galvanizing lines is fewer than that of CGL, thus limiting the production of these high alloy zinc coatings.

Another measure to reduce micro-cracking is to reduce the liquid phase by heat treating zinc-based coatings prior to hot stamping/hot press forming, which is essentially an indirect press-hardening or hot-stamping process. For example, US Patent Application Publication No. 2014/0342181A1 discloses a method for producing zinc-coated steel strip for press-hardening applications, where prior to hot stamping/hot press forming, a galvannealed steel strip is heat treated at a temperature between 850° F. (454° C.) and 950° F. (510° C.) in a protective atmosphere (100% nitrogen ($N_2$) or 95% $N_2$ and 5% hydrogen ($H_2$) to pre-alloy the coating. In a conventional CGL, however, there typically is no heating section available to subsequently (or in-line) heat treat the galvannealed steel strip in a protective atmosphere. Thus, this process would add considerable cost.

SUMMARY

In a first embodiment, a method for producing a cathodic corrosion protected press hardened steel is provided, the method comprising the steps of: (i) contacting a hardenable steel alloy in a coating process with a coating, the coating comprising zinc, aluminum, and one or both of manganese (Mn) and antimony (Sb) so as to provide a coated hardenable steel alloy; (ii) heating, at least a portion of the coated hardenable steel alloy, to a temperature necessary for press hardening; (iii) optionally hot forming the coated steel alloy before or after the heating; and (iv) cooling the coated steel alloy after the heating step, wherein the coating comprises a cathodic protection amount of zinc content in a $\alpha$ (Fe, Zn) phase after the heating step. In one aspect, the coating process is continuous.

In a second embodiment, a method for producing a cathodic corrosion protected press hardened steel is provided, the method comprising the steps of: (i) contacting a hardenable steel alloy in a coating process with a coating, the coating comprising zinc, aluminum, and one or both of manganese (Mn) and antimony (Sb) so as to provide a coated hardenable steel alloy; (ii) providing sheet-coating interface between the hardenable steel alloy and the coating, the sheet-coating interface facilitating iron-zinc diffusion; (iii) heating, at least a portion of the coated hardenable steel alloy, to a temperature necessary for hot forming; (iv) optionally press hardening the coated steel alloy before or after the heating; and (v) cooling the coated steel alloy after the heating step, wherein the coating comprises a cathodic protection amount of zinc content in a $\alpha$ (Fe, Zn) phase and the reduction or elimination of a zinc-rich $\Gamma$ phase after the heating step. In one aspect, the coating process is continuous.

In a third embodiment, a method for producing a hardened profiled structural part from a hardenable steel alloy, where the hardened profiled structural part has cathodic corrosion protection, is provided, the method comprising: contacting a sheet made of a hardenable steel alloy with a coating, wherein the coating comprises zinc, and the coating further comprises aluminum and one or both of manganese (Mn) and antimony (Sb) satisfying the relationship (I) when antimony is absent: [0.1+Mn (wt. %)/30]≤Al (wt. %)≤[0.3+Mn (wt. %)/20] (I); or satisfying the relationship (II) when both manganese and antimony are present: [0.1+Mn (wt. %)/30+Sb (wt. %)/50]≤Al (wt. %)≤[0.3+Mn (wt. %)/20+Sb (wt. %)/50] (II); subsequently hot forming the coated sheet steel; and cooling the sheet.

In a fourth embodiment, a cathodic corrosion-protection layer configured for sheet steel that is subjected to a hot forming process is provided, the corrosion-protection layer comprising zinc; aluminum; and one or both of manganese (Mn) and antimony (Sb) satisfying the relationship (I) when antimony is absent: [0.1+Mn (wt. %)/30]≤Al (wt. %)≤[0.3+Mn (wt. %)/20] (I); or satisfying the relationship (II) when both manganese and antimony are present: [0.1+Mn (wt. %)/30+Sb (wt. %)/50]≤Al (wt. %)≤[0.3+Mn (wt. %)/20+Sb (wt. %)/50] (II).

In a fifth embodiment, a sheet steel comprising a cathodic corrosion-protection layer is provided, the corrosion-protection layer comprising zinc; aluminum, and an amount of manganese (Mn) providing: a weak, Al-rich inhibition layer at the substrate-cathodic corrosion-protection layer interface during hot forming; or accelerating the transformation of zinc-rich Γ phase to α (Fe, Zn) phase during hot forming.

In a sixth embodiment, a hot formed sheet steel article comprising a corrosion-protection layer is provided, the corrosion-protection layer comprising zinc; aluminum, and one or both of manganese (Mn) and antimony (Sb); and the corrosion-protection layer comprises at least an α (Fe, Zn) phase and is essentially absent of a zinc-rich Γ phase.

In a first aspect of any one of the previous embodiments, the cathodic protection amount of zinc in the α (Fe, Zn) phase of the post press hardened coating is at least 18 wt. % zinc, at least 19 wt. %, at least 20% wt., at least 21 wt. %, or at least 22 wt. % of zinc content in the α (Fe, Zn) phase.

In an aspect of any one of the previous embodiments the contacting step provides a sheet-coating interface, wherein formation of a strong Al-rich inhibition layer at the sheet-coating interface is avoided or eliminated. In an aspect of anyone of the previous embodiments, a zinc-rich Γ phase in the coating is absent.

In an aspect of any one of the previous embodiments, when both Mn and Sb are present, the total wt. % of Mn+Sb≤1.0. In an aspect of any one of the previous embodiments, Mn and/or Sb facilitates Fe—Zn diffusion during the hot forming step.

In an aspect of any one of the previous embodiments, when either Mn or Sb is present, a strong Al-rich inhibition layer is reduced or eliminated at the sheet-coating interface during the hot forming step. In an aspect of the previous embodiments, when Sb is present, the method further comprises reducing the surface tension of molten zinc, and improving coating uniformity and smoothness.

In an aspect of any one of the previous embodiments, the press-hardenable steel strip is reheated immediately following the Zn alloy coating step so as to promote pre-alloying of the coating with the press hardenable steel strip.

In an aspect of any one of the previous embodiments, the coated press hardenable steel strip is reheated using a galvannealing temperature of between about 480° C. and about 600° C., with a holding time from 2 to 20 seconds to provide a pre-alloyed substrate. In an aspect of any one of the previous embodiments, the coated press hardenable steel strip is reheated using a galvannealing temperature of between about 520° C. and about 580° C., with a holding time from 5 to 10 seconds.

In an aspect of any one of the previous embodiments, during the heating step prior to press hardening, fast diffusion of the zinc into the steel iron suppresses zinc evaporation and minimizes a liquid phase of zinc in the coating.

In a seventh embodiment, a cathodic corrosion-protection layer configured for sheet steel that is subjected to a hot forming process is provided. The corrosion-protection layer forms an interface with the steel sheet. The corrosion-protection layer comprises zinc; iron; aluminum; and an amount of one or both of manganese (Mn) and antimony (Sb), inhibiting or preventing formation of a strong aluminum-rich inhibition layer at the interface during the hot forming process and/or accelerating zinc-rich Γ phase transition to α (Fe, Zn) phase within the cathodic corrosion-protection coating during the hot forming process. In another aspect, a boron containing or non-boron containing press hardenable steel sheet comprising the cathodic corrosion-protection layer is provided.

In an eighth embodiment, a method of reducing or eliminating liquid metal induced embrittlement (LMIE) in a cathodic corrosion-protection coated steel sheet subjected to hot forming is provided, the method comprising the steps of: contacting a sheet made of a hardenable steel alloy with a cathodic corrosion-protection coating so as to provide a sheet-coating interface, the cathodic corrosion-protection coating comprising predominantly zinc, an amount of aluminum, and an amount of one or both of manganese (Mn) and antimony (Sb) inhibiting or preventing formation of a strong aluminum-rich inhibition layer at the sheet-coating interface during the hot forming process and/or accelerating zinc-rich Γ phase transition to α (Fe, Zn) phase within the cathodic corrosion-protection coating during the hot forming process; subsequently hot forming the coated sheet steel; and providing, in the cathodic corrosion-protection coating, an α (Fe, Zn) phase in the absence of a zinc-rich Γ phase. In one aspect, the cathodic corrosion-protection coating comprises an amount of zinc in the α (Fe, Zn) phase of the post press hardened coating of at least 18 wt. % zinc, at least 19 wt. %, at least 20% wt., at least 21 wt. %, or at least 22 wt. %. In another aspect, the total wt. % of Mn+Sb in the cathodic corrosion-protection coating is ≤1.0, where the substrate is a boron-containing or a non-boron containing steel.

DETAILED DESCRIPTION

Figure 1A:
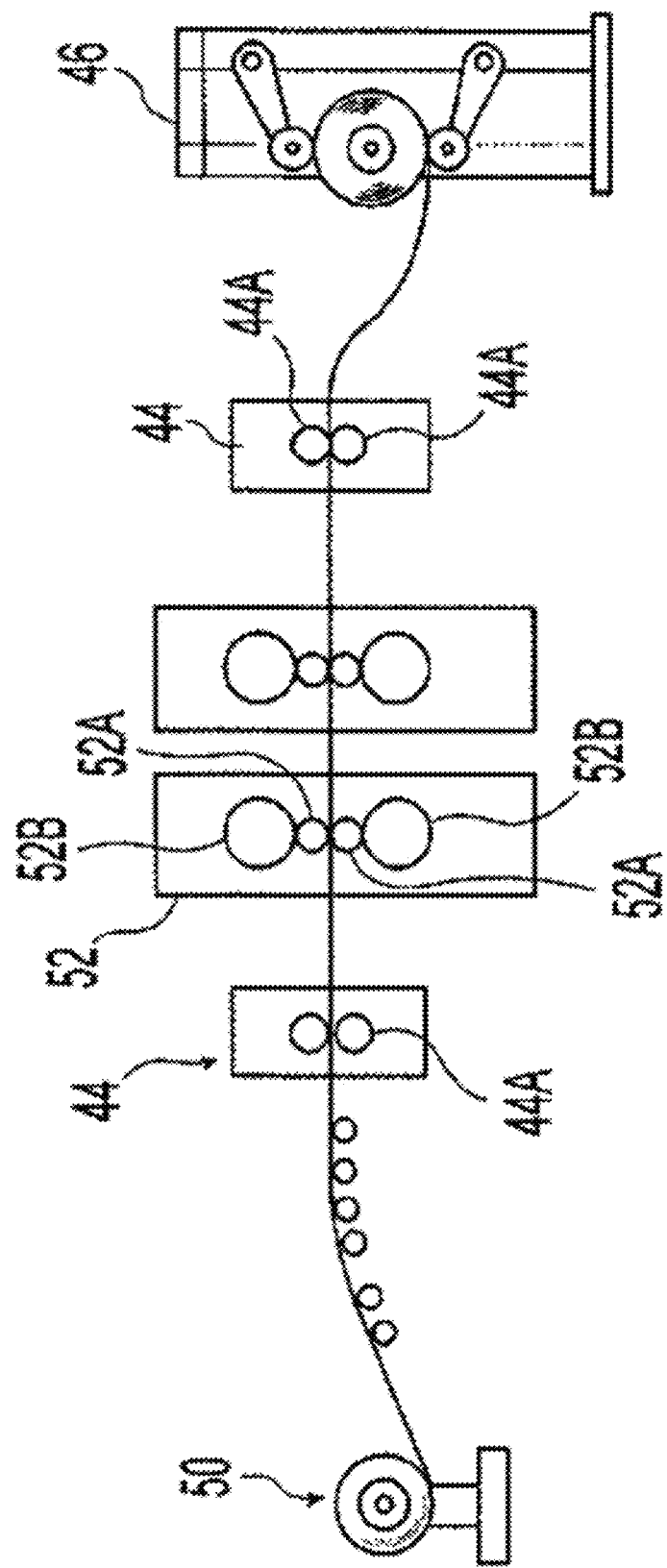
FIG. 1A is a diagrammatic side view of an exemplary casting process including hot rolling mills according to the present disclosure.

One objective of the present disclosure is to provide a solution to the technical problem of applying a zinc-based alloy coating to press-hardenable steel strip through a conventional continuous galvanizing line (CGL) without the detriment of increased cost, longer production time, or additional manufacturing steps that can be used in a direct press-hardening process at a high austenitization temperature, e.g., up to 950° C., and subsequently provide cathodic protection to the coated steel substrate.

The present disclosure provides a solution to this technical problem by providing a zinc-based alloy coating bath and method of coating for PHS where the Γ phase is reduced or eliminated in the resultant coating. Consequently, the effect of liquid metal induced embrittlement (LMIE), which is a main cause of micro-cracking in the press hardened steel parts, is averted or significantly reduced. In the presently disclosed process using the disclosed bath, zinc-rich liquid is minimized and thus, after being hot press formed, the GI and GA coatings, which can be produced on CGLs, can readily retain the capability of cathodic protection for the PHS substrate.

The press hardenable steel can be a complex phase steel, for example a dual phased PHS steel, a complex microstructure steel with fine complex precipitates, a TRIP steel, a PHS-ductile biphasic steel, and the like. Suitable steel substrates for the presently disclosed coating bath and coating method can be provided by using conventional steel casting, hot rolling, and cold rolling process techniques. For example, a continuous metal slab caster having a casting mold, such as but not limited to a compact strip production facility and introducing molten steel having a composition having elements within defined PHS ranges into the casting mold. The steel slabs can be hot rolled to form respective hot bands using hot rolling termination temperatures or finishing exit temperatures, for example ranging from $(A_{r3}-20)°$ C. to 1000° C. (1832° F.). Immediately after completing hot rolling, the hot rolled steel sheets can be water cooled at a conventional run-out table using cooling rates of at least 3° C./s (5.4° F./s) down to the coiling temperatures anywhere below 800° C. (about 1472° F.) ranging from 425° C. (797° F.) to 750° C. (1382° F.), and then can be coiled at the corresponding temperatures. After hot rolling and coiling, the hot bands can be pickled or otherwise surface treated to improve surface quality and then cold rolled to obtain a final thickness of the cold rolled steel sheet. Typically reduction is at least 25% up to 80% of the hot rolled steel sheet thickness. In one example, cold rolling can be performed so as to provide a cold rolled steel sheet of approximately 1.5 mm thickness. In another example, the cold rolling step can be performed at a conventional reversing cold mill using total cold reduction in a range between 30% and 70%.

In one aspect, a press-hardenable steel is used as the substrate. Exemplary press-hardenable steel useful in the current disclosure is a medium carbon, boron steel, such as some OEM automotive grade steels. For example, a medium carbon, boron steel comprising or consisting of 0.1-0.35 weight percent carbon, 1.0-2.5 weight percent manganese (Mn), 0.01-0.05 weight percent aluminum (Al), less than or equal to 0.5 weight percent silicon (Si) less than or equal to 0.5 weight percent chromium (Cr), 0.02-0.05 weight percent titanium (Ti), less than or equal to 0.1 weight percent niobium, less than or equal to 0.01 weight percent nitrogen (N), 0.0005-0.004 weight percent boron (B) and no purposefully added phosphorus and sulfur is used.

In another aspect, a medium carbon, non-boron, low manganese press hardenable steel can be used, for example, comprising or consisting of 0.17-0.25 weight percent carbon, 0.015-0.05 weight percent manganese, 0.015-0.05 weight percent aluminum, less than or equal to 0.06 weight percent titanium, less than or equal to 0.10 weight percent niobium (Nb) and no purposefully added boron, phosphorus, and sulfur is used.

In another aspect, a low carbon boron-containing press hardenable steel can be used, for example, comprising or consisting of 0.015-0.08 weight percent carbon, 0.025-0.045 weight percent manganese, 0.005-0.009 weight percent boron, with no purposefully added phosphorus and sulfur can be used.

In one example, a press hardenable steel useful in the current disclosure is a boron steel containing 0.20-0.25 weight percent carbon, 1.1-1.5 weight percent manganese (Mn), 0.02-0.06 weight percent Al, 0.02-0.05 weight percent titanium (Ti), 0.0005-0.0035 weight percent boron (B) as well as less than 0.5 weight percent silicon (Si) and 0.35 weight percent chromium (Cr). In another aspect, the press-hardenable steel useful in the current disclosure is absent intentionally added boron (e.g., recycled scrap steel) containing alloying additions such that PHS properties are obtained, as is known in the art.

To eliminate the Γ phase from the resultant coating on the PHS steel subsequent to hot stamping/hot press forming, hot forming, or press hardening (hereinafter collectively referred to as "press hardening"), the present disclosure controls bath chemistry and additional processing variables in the continuous galvanizing process. While it is likely that the presence of Γ phase benefits the cathodic protection due to its high zinc content (>60 wt. %), the presently disclosed bath and coating process nonetheless provides for the elimination or reduction of zinc-rich Γ phase in the resultant coating of zinc alloy coated PHS after being press hardened without loss of cathodic protection for the steel substrate.

In addition, the present bath and coating method minimizes the effect of LMIE while retaining the cathodic protection of the resultant coating for the steel substrate. The production of the presently disclosed zinc-based alloy coating can be readily incorporated in a conventional CGL. Exemplary conditions for a method of coating are provided under the following conditions.

In one exemplary aspect the zinc-based alloy coating is applied to a cold rolled steel strip through a continuous galvanizing line (CGL), however, other galvanizing processing techniques may be used. This zinc-based alloy coating is prepared under the following conditions, using a CGL as an exemplary processing embodiment, in order to minimize Γ phase (i.e. the liquid phase prior to solidification) in the resultant coating after the direct press-hardening process.

In the following description a cold rolled steel strip is used as the exemplary substrate, where the cold rolled steel sheet is prepared from casting to provide a hot rolled sheet, the hot rolling termination temperature or finishing exit temperature can be between $(A_{r3}-30)°$ C. and 1000° C. (1832° F.) for example, followed by cooling after hot rolling at a mean cooling rate of at least about 3° C./s (5.4° F./s), for example, followed by coiling at a temperature below about 800° C. (about 1472° F.) down to ambient temperature. In one aspect, the coiling temperature is between about 425° C. (about 797° F.) and about 750° C. (about 1382° F.). The hot rolled sheet is subsequently cold rolled to the desired steel sheet thickness, with a cold reduction of at least 25%.

Other substrate forms can be used such as steel slab, hot rolled or cold rolled, wire, rebar and the like. The cold rolled steel strip can be hot dipped in the presently disclosed bath without being annealed. In one aspect, the steel sheet is annealed before hot-dipping using the following conditions. Any industrial annealing conditions are acceptable to carry out the present disclosure.

Pre-Hot Dip Annealing

In one aspect, an annealing atmosphere consisting of 5% $H_2$ and 95% $N_2$ at a given dew point is used. Such a reducing environment is able to reduce iron oxide but inadequate to reduce the oxides formed from elements such as Al, Si and Mn that may be present in the steel substrate. For example, manganese is an alloying element that may be present in the press hardenable-steel substrate. During the annealing treatment, Mn present in the steel substrate or its surface is likely oxidized into MnO, which forms a thin film on the steel surface. As the MnO film cannot be reduced in the 5% $H_2$ and 95% $N_2$, annealing atmosphere, or other like annealing atmosphere, it stays on the steel strip during the hot-dipping. After the steel strip is galvanized, MnO residues remain at the steel/coating interface and may affect the surface quality of the galvanizing coating. During the austenitization stage of the hot-stamping process, the oxide can act as a barrier to restrain the diffusion between the iron in the steel substrate and the zinc in the coating.

A fast Fe—Zn diffusion is desired between the coating and the steel substrate so as to suppress zinc evaporation and to minimize the zinc liquid phase in the coating. In one aspect, the currently disclosed bath chemistry and coating method provides that the cold rolled steel strip is annealed through a heating cycle with a peak annealing temperature between 550° C. and 900° C. for between 5 seconds and 900 seconds. In another aspect, the cold rolled steel strip is annealed through a heating cycle with a peak annealing temperature between 550° C. and 750° C. for between 10 seconds and 600 seconds. At this annealing temperature range, the oxidation of alloying elements in the steel, such as Mn, Si and Al, would be significantly reduced or eliminated providing for improved diffusion between the substrate and the zinc coating.

Dew Point Control

The dew point is indicative of the oxygen partial pressure in the annealing atmosphere. A high dew point indicates a high oxygen partial pressure and vice versa. In a 5% $H_2$—$N_2$ atmosphere, a steel strip is typically annealed prior to hot dipping at a dew point of −30° C. (corresponding to an oxygen partial pressure of $5.6 \times 10^{-24}$ atm) to avoid the oxidation of the steel iron. Increasing the dew point to some extent (e.g. from −30° C. to 0° C.) can keep the iron from oxidation while increasing the oxygen partial pressure. Advanced high strength steels, including PHS, typically containing high levels of oxidizing elements (e.g. Mn and Si) and if they are annealed at a high dew point (e.g. dew point of 0° C., corresponding to an oxygen partial pressure of $1.5 \times 10^{-21}$ atm), internal oxidation occurs as there is a relatively high partial pressure, and oxygen is more likely driven into the steel and readily oxidizes alloying elements internally (i.e. under the steel surface). Internal oxidation provides improved coating adherence to the steel due to the lack of surface oxides and as a result, there is a benefit from the viewpoint of galvanizing. During the hot stamping/hot press forming of zinc-coated PHS, the absence of surface oxides is believed to reduce barriers to the diffusion between the steel iron and the coating zinc.

As a result, in one aspect, the current disclosure provides that a relatively high dew point in a range from −60° C. to 10° C. is employed for the annealing treatment of the press-hardenable steel strip prior to hot dipping so as to facilitate the subsequent Fe—Zn diffusion in the austenitization stage of the press hardening process. In another aspect, the current disclosure provides that a relatively high dew point in a range from −40° C. to 0° C. is employed for the annealing treatment of the press-hardenable steel strip.

Steel Entry Temperature

In a continuous galvanizing process, the steel entry temperature (the steel temperature just before the steel strip is dipped into the bath) is typically maintained at a temperature approximately 1° C.-5° C. above the bath temperature. A higher steel entry temperature than that of the bath is generally understood to promote the Al—Fe reaction at the interface, thereby increasing the Al pickup and resulting in a well-established $Fe_2Al_5Zn_x$ inhibition layer. However, for press-hardenable steels, a strong inhibition layer at the steel/coating interface is to be avoided in the presently disclosed method so as to maximize Fe—Zn diffusion during the hot-stamping process. Thus, in one aspect of the current disclosure, a bath chemistry and coating process of galvanizing press-hardenable steels provides for steel entry temperature that is maintained at a temperature approximately 5° C.-20° C. lower than the bath temperature. For example, if the bath temperature is 460° C., the steel entry temperature is provided in a range from 440° C. to 455° C.

Bath Chemistry

For a galvanizing bath, an effective amount of aluminum (Al) (which is the amount of Al dissolved in the molten zinc bath) typically ranges from 0.15 wt. % to 0.25 wt. % so as to form a $Fe_2Al_5Zn_x$ layer at the steel/coating interface. This interfacial layer plays a role in impeding the development of brittle Fe—Zn intermetallics—thus enhancing the coating adherence and formability. In one aspect of the presently disclosed method, an "inhibition" role of the press-hardenable steel substrate is substantially weakened to facilitate the Fe—Zn diffusion during the hot-stamping process. For press-hardenable steels, however, aluminum provides another role, e.g., the Al in the coating oxidizes into $Al_2O_3$ during the hot stamping/hot press forming, which acts as a protective layer on the surface of the resultant coating that suppress zinc evaporation.

A high bath Al level results in a coating with a high content of Al so as to promote the formation of $Al_2O_3$ during the hot-stamping process. However, there is an undesirable side effect resulting from a high bath Al level in a hot dipped zinc coating bath. The Al-rich inhibition layer would be overly developed at the steel/coating interface, making it difficult to break down during the hot stamping/hot press forming process. During the austenitization treatment, a fast diffusion of the zinc into the steel iron suppresses and/or competes with zinc evaporation and minimizes the liquid phase of zinc in the coating. If this Zn—Fe interaction is retarded by a strong interfacial layer, both zinc evaporation and the portion of liquid phase would consequently increase, which leads to undesirable effects.

The current disclosure overcomes this technical problem by providing the following technical solution. While the dissolved Al content in the presently disclosed bath is provided in a range from 0.12 wt. % to 0.50 wt. % Al so as to provide for the formation of sufficient $Al_2O_3$ during the hot-stamping process, nonetheless that amount of Al addition is such that the formation of a strong Al-rich inhibition layer at the substrate interface that would otherwise hinder the Fe—Zn diffusion is avoided or eliminated. To achieve this technical solution, the control of the bath Al wt. % alone is not sufficient. In the current disclosure, an amount of at least one element selected from Mn and antimony (Sb) is added to the bath in combination with the aforementioned dissolved Al content in the range from 0.12 wt. % to 0.50 wt. % Al with no purposefully added iron.

In one aspect, at least one element selected from Mn or Sb is used. When only one element is selected and that element is Mn, the following formula (I) applies: [0.1+Mn (wt. %)/30]≤Al (wt. %)≤[0.3+Mn (wt. %)/20] (I).

When both Mn and Sb our employed in the bath, then formula (II) applies: [0.1+Mn (wt. %)/30+Sb (wt. %)/50] ≤Al (wt. %)≤[0.3+Mn (wt. %)/20+Sb (wt. %)/50] (II).

In one aspect, the total amount of Mn and/or Sb added to the bath is from about 0.2 wt. % to about 1.0 wt. %, and the dissolved Al content is in the range from 0.12 wt. % to 0.50 wt. % Al, the remainder being essentially zinc with no purposefully added iron.

In one aspect, the bath is from about 0.3 wt. % to about 1.0 wt. % total Mn and/or Sb, and the dissolved Al content is in the range from 0.12 wt. % to 0.50 wt. % Al, with no other purposefully added transition metals, the remainder being essentially zinc, and satisfying formula (I).

In another aspect, the bath is from about 0.3 wt. % to about 0.7 wt. % total Mn and/or Sb, and the dissolved Al content is in the range from 0.12 wt. % to 0.50 wt. %, the remainder being essentially zinc. In another aspect, the bath is from about 0.3 wt. % to about 0.7 wt. % total Mn and/or Sb, and the dissolved Al content is in the range from 0.12 wt. % to 0.50 wt. %, with no other purposefully added transition metals, the remainder being essentially zinc, and satisfying formula (I).

In another aspect, the bath is from about 0.5 wt. % to about 1.0 wt. % total Mn and/or Sb, and the dissolved Al content is in the range from 0.12 wt. % to 0.50 wt. %, the remainder being essentially zinc. In another aspect, the bath is from about 0.5 wt. % to about 1.0 wt. % total Mn and/or Sb, and the dissolved Al content is in the range from 0.12 wt. % to 0.50 wt. %, with no other purposefully added transition metals, the remainder being essentially zinc, and satisfying formula (I) or, if Sb is present, satisfying formula (II).

In another aspect, the bath is from about 0.5 wt. % up to 1.0 wt. % Mn and 0.3 wt. % up to 1.0 wt. % Sb, with the total wt. % of Mn+Sb≤1.0, and the dissolved Al content is in the range from 0.2 wt. % to 0.50 wt. % Al, the remainder being essentially zinc. In another aspect, the bath is from about 0.5 wt. % up to 1.0 wt. % Mn and 0.3 wt. % up to 1.0 wt. % Sb, with the total wt. % of Mn+Sb≤1.0, and the dissolved Al content is in the range from 0.2 wt. % to 0.50 wt. % Al, with no other purposefully added transition metals, the remainder being essentially zinc, and satisfying formula (II).

In another aspect, the bath is at least 0.5 wt. % up to about 1.0 wt. % Mn and the dissolved Al content is at least 0.2 wt. % up to 0.50 wt. %, the remainder being essentially zinc and satisfying formula (I). In another aspect, the bath is at least 0.5 wt. % up to about 1.0 wt. % Mn and the dissolved Al content is at least 0.2 wt. % up to 0.50 wt. %, with no other purposefully added transition metals, the remainder being essentially zinc and satisfying formula (I).

In one aspect, the bath is at least 0.2 wt. % to about 1.0 wt. % total Mn and/or Sb, and the dissolved Al content is in the range from 0.15 wt. % to 0.50 wt. % Al, with no other purposefully added transition metals, the remainder being essentially zinc and satisfying formula (I) and if Sb is present, satisfying formula (II). In another aspect, the bath is at least 0.2 wt. % to about 1.0 wt. % total Mn and/or Sb, and the dissolved Al content is at least 0.19 wt. % to 0.50 wt. % Al, with no other purposefully added transition metals, the remainder being essentially zinc and satisfying formula (I), and if Sb is present, satisfying formula (II). In another aspect, the bath is at least 0.2 wt. % to about 1.0 wt. % total Mn and/or Sb, and the dissolved Al content is at least 0.2 wt. % to 0.50 wt. % Al, with no other purposefully added transition metals, the remainder being essentially zinc and satisfying formula (I), and if Sb is present, satisfying formula (II).

In one aspect, the bath is at least 0.5 wt. % to about 0.7 wt. % total Mn and/or Sb, and the dissolved Al content is in the range from 0.15 wt. % to 0.50 wt. % Al, with no other purposefully added transition metals, the remainder being essentially zinc. In another aspect, the bath is at least 0.5 wt. % to about 0.7 wt. % total Mn and/or Sb, and the dissolved Al content is at least 0.19 wt. % to 0.50 wt. % Al, with no other purposefully added transition metals, the remainder being essentially zinc and satisfying formula (I), and if Sb is present, satisfying formula (II). In another aspect, the bath is at least 0.5 wt. % to about 0.7 wt. % total Mn and/or Sb, and the dissolved Al content is at least 0.2 wt. % to 0.50 wt. % Al, with no other purposefully added transition metals, the remainder being essentially zinc and satisfying formula (I), and if Sb is present, satisfying formula (II).

It has been disclosed that the addition of Mn in a galvanizing bath can shift the invariant point of (delta) δ (FeZn$_{10}$)/(eta) η (Fe$_2$Al$_5$) in the Zn—Fe—Al ternary system to a higher Al level. With the addition of Mn in the presently disclosed bath, however, a higher than normal Al level is used to form a complete Fe$_2$Al$_5$Zn$_x$ inhibition layer at the steel/coating interface. Alternatively, Sb can be employed so as to possibly interact with the bath Al, thus reducing the effectiveness of the Al-rich inhibition layer for the reasons stated above. The use of Mn and/or Sb additions in the presently disclosed bath is believed to ease the inhibition effect of the interfacial layer and facilitate Fe—Zn diffusion during the high temperature press hardening process. In addition, a small amount of Sb can be added (with or without Mn) to the galvanizing bath so as reduce the surface tension of molten zinc, thus improving the coating uniformity and smoothness of the PHS sheet.

Sheet Coating Weight

To minimize the zinc-rich liquid phase in the resultant coating utilizing the presently disclosed method, it has heretofore been found to control the coating weight of the sheet in the CGL. Excessive zinc oxidation and a high portion of the zinc-liquid phase are more likely to result from a thick coating than from a thin coating. However, overly thin coatings may not be sufficient to withstand zinc evaporation and oxidation. In one aspect, the currently disclosed method targets a coating weight between 40 g/m$^2$ and 120 g/m$^2$. In another aspect, the currently disclosed method targets a coating weight between 60 g/m$^2$ and 90 g/m$^2$. These coating weights ensure that sufficient zinc for cathodic protection can be preserved in the resultant coating after the direct press-hardening process.

Pre-Alloying or Galvannealing of the Coating and Substrate

In one aspect, the coated steel sheet can be used immediately following the coating without pre-alloying or galvannealing. In another aspect, the coated steel sheet is galvannealed.

Typically, a conventional galvannealing (GA) process, the bath Al level is adjusted slightly lower than the bath Al level for a galvanizing (GI) process, e.g., between about 0.11 wt. % to about 0.14 wt. %, lower than the galvanizing bath Al level. The low Al level in the conventional GA bath is chosen to avoid formation of a complete Fe$_2$Al$_5$Zn$_x$ inhibition layer to hinder the Fe—Zn diffusion. However, this low Al level is insufficient for PHS substrates and their use in subsequent press hardening applications.

Thus, to overcome this technical problem of the conventional methods, in one aspect of the current disclosure, the press-hardenable steel strip is reheated immediately following the hot dipping so as to promote the alloying process. In one aspect, the hot-dipped press hardenable steel strip is reheated using a high galvannealing temperature of between about 480° C. and about 600° C., with a holding time from 2 to 20 seconds to provide a pre-alloyed substrate. In another aspect, the hot-dipped press hardenable steel strip is reheated using a high galvannealing temperature of between about 520° C. and about 580° C., with a holding time from 5 to 10 seconds to provide a pre-alloyed substrate. Due to the Al content higher than 0.15 wt. % in the currently disclosed bath, the coating composition cannot be fully alloyed in a conventional galvannealing furnace and is referred to as a pre-alloyed coating. Compared to the unalloyed coating (i.e. galvanized coating), this pre-alloyed coating is more readily converted into zinc-containing α-Fe during the hot-stamping process, thus minimizing the zinc-rich liquid phase in the resultant coating. Thus, for at least one reason, the aforementioned combination of bath chemistry and processing conditions coordinate synergistically to provide a coating suitable for subsequent press hardening applications.

A steel or iron cast strand, for example, provided in a continuous metal slab caster can be used in the presently disclosed method. The cast strand, as shown by the arrow in FIG. 1A, for example, cast from a steel slab caster into a ladle 12 that supplies a tundish 16 feeding a casting mold 20 and pinch rolls 32 and straighter 34 and then can be passed through a pinch roll stand 44 with pinch rolls 44A and then passed to at least one hot rolling mill 36, comprising a pair of reduction rolls 36A and backing rolls 36B, where the cast strip is hot rolled to reduce to a desired thickness. The rolled strip passes onto a run-out table 40 where it is cooled by contact with water supplied via water jets 42 or by other suitable means, and by convection and radiation. In any event, the rolled strip may then pass through a pinch roll stand 44 comprising a pair of pinch rolls 44A and then may be directed to a coiler 46.

Alternately, the strand 28 may be directed to a cutting tool 38, such as but not limited to a shear, after the cast metal strand exits the withdrawal straightener 34 and is sufficiently solidified to be cut laterally (i.e., transverse to the direction of travel of the cast strand). As the strand 28 is cut into slabs, blooms, or billets, for example, the intermediate product may be transported away on rollers or other supports to be hot rolled.

During casting, water (or some other coolant) is circulated through the casting mold 20 to cool and solidify the surfaces of the cast strand 28 at the mold faces. The rollers of the withdrawal straightener 34 may also be sprayed with water, if desired, to further cool the cast strand 28. The resultant hot rolled steel may then processed through an annealing and hot dip coating system or galvanizing line.

Figure 1B:
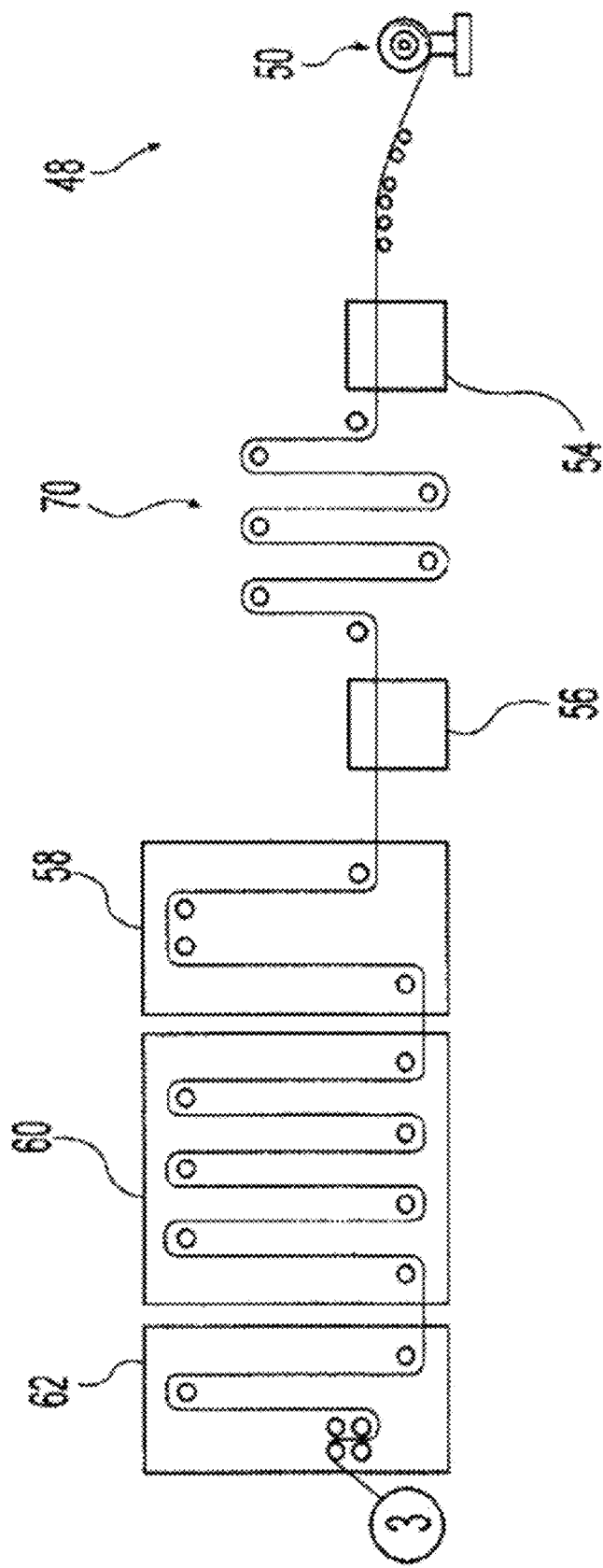
FIG. 1B is a diagrammatic side view of an exemplary cold rolling process according to the present disclosure.
Figure 2:
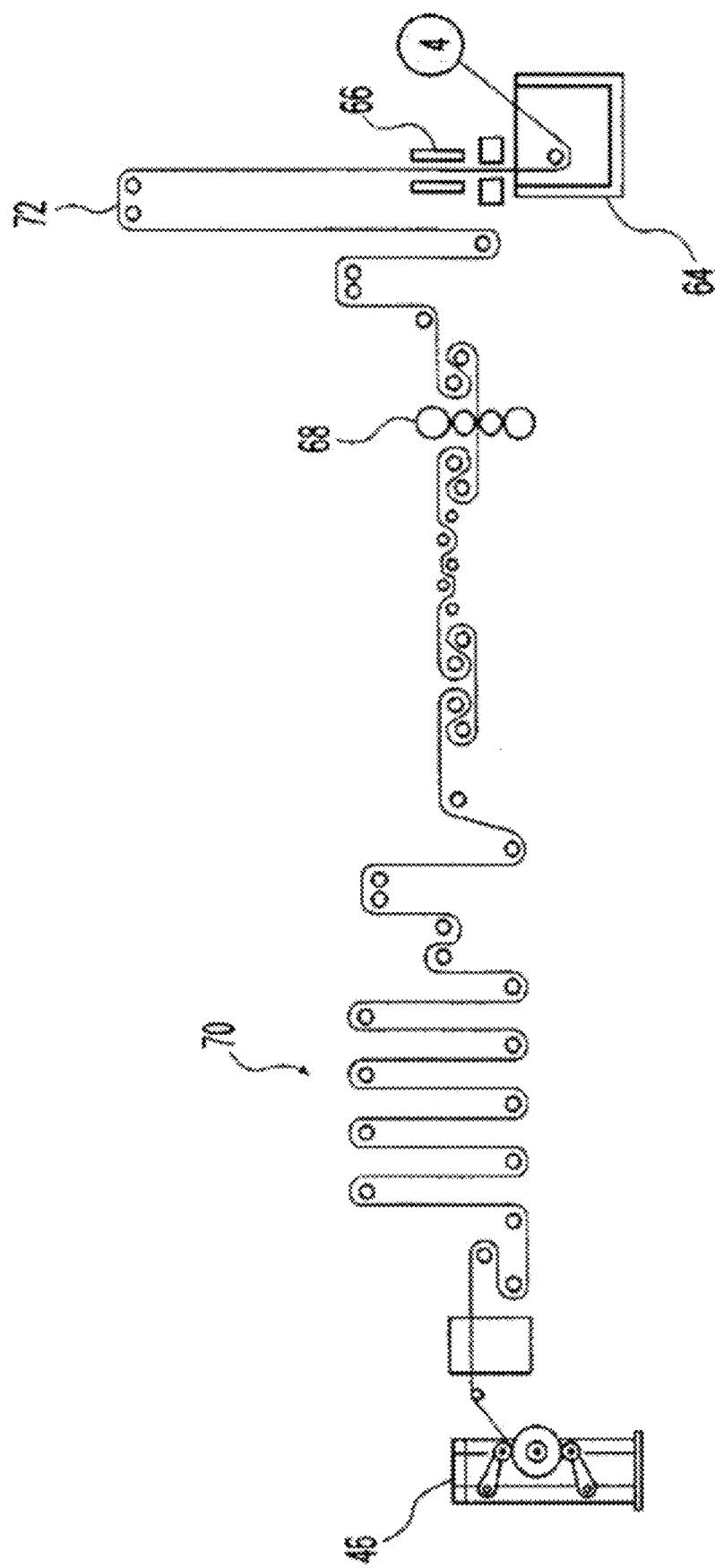
FIG. 2 is a diagrammatic side view of a portion of an exemplary continuous annealing and hot dip coating line showing the continuous annealing portion according to the present disclosure.

In another embodiment, the hot rolled steel is cold rolled for use in the presently disclosed method. Thus, as shown in FIG. 1B, and FIG. 2, an exemplary continuous galvanizing line (CGL) process is depicted. Thus, with reference to FIG. 1B, a coiled cold rolled sheet is processed through a continuous annealing and coating system or galvanizing line as further discussed below. As shown in FIG. 1B, the continuous annealing and coating system includes a sheet feeding facility, in which the cold rolled steel is placed on an uncoiler 50. The steel sheet can be configured to pass through a welder (not shown) capable of joining the tailing end of one sheet with the leading end of another sheet. The sheet can be configured to pass through a cleaning station 54 with a rinse bath 56 and optionally at least one sheet accumulator 70 to accommodate variations in feeding the sheet through the continuous annealing and coating system. The continuous annealing and coating system can further include a heating zone 58, a soaking or annealing zone 60, and a cooling zone 62. The now coated sheet can be introduced to an optional uncoiler 34 for storage or for transport, or the now coated sheet can be used immediately.

With reference to FIG. 2, one example is shown, whereas the steel sheet is heated, by any number of means (not shown), to the desired bath entry temperature, the sheet can be configured to pass through a galvanizing bath 64 comprising the presently disclosed bath composition. An in-line coating annealing furnace, or galvannealing furnace 66 can be used as shown. By way of example only, as shown in FIG. 2, the steel is air cooled by traveling through an air cooling tower 72 or other cooling system. The continuous annealing and coating system can include a temper mill 68, as shown and optionally at least one sheet accumulator 70 to accommodate variations in feeding the sheet through the continuous annealing and coating system. Cooling systems and other chemical treatments may be provided. The coated sheet can then be taken up on a coiler 46 for storage or transport.

EXAMPLES

Zn baths were prepared using conventional methods. From a representative zinc bath of the present disclosure containing approximately 0.15% Al and 0.7% Mn, the top dross particles were taken for analysis. The analysis found that the top dross contained approximately 4.5 wt. % Al and 3.1 wt. % Mn. Medium carbon and non-boron containing steels were used, where medium carbon steels had the chemical composition (in weight percent): 0.170-0.250% C, 0.45-2.0% Mn, 0.015-0.05% Al, and absent intentionally added B, Ti, P, and S; and the low carbon and boron-containing steels had the chemical composition: 0.015-0.08% C, 0.20-1.0% Mn, 0.025-0.045% Al, 0.0005-0.0099% B and absent intentionally added P and S.

Galvanostatic Testing:

To evaluate the cathodic protection of the comparative and presently disclosed coatings, a galvanostatic test was performed to record the potential evolution of the coating versus test time at a fixed current density (12.7 mA/cm$^2$). The potential evolution of the coating was then compared to that of bare PHS tested under the same condition. The galvanostatic testing was conducted in accordance with the procedure described in U.S. Pat. No. 8,021,497B2. An electrochemical cell with three electrodes, including working electrode (i.e., sample), reference electrode (saturated calomel electrode) and counter electrode (platinum mesh), was used for the testing. The electrolyte was made of deionized water with 100 g/L ZnSO$_4$.5H$_2$O and 200 g/L NaCl.

Comparative Example C1—Conventional GI Coating

Figure 3:
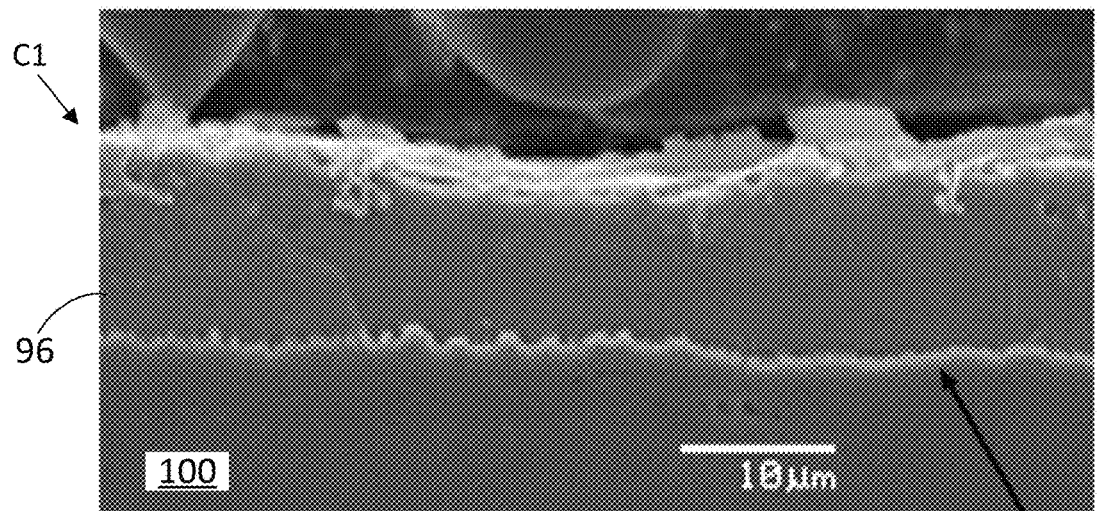
FIG. 3 is a microstructure SEM image of a cross-section from a comparative, not hot press formed, GI coated steel part produced using a conventional galvanizing bath chemistry.

Press-hardenable steel sheet 100 was galvanized (GI) through a continuous galvanizing line (CGL) under conventional production conditions. The GI coating weight was approximately 70 g/m$^2$. As shown in FIG. 3, coating 96 microstructure was that of a typical GI coating, consisting of a zinc coating layer and a very thin inhibition layer. The thin layer composed of Al-rich ternary intermetallic compound (Fe$_2$Al$_5$Zn$_x$) acted as an effective barrier to retard the reaction between zinc and Fe, thereby inhibiting the formation of Zn—Fe intermetallic compound at the steel/coating interface. Chemical analysis indicated that the content of bulk Al and Fe in the conventional GI coating was 0.54 wt. % and 0.69 wt. %, respectively.

Example 1 (According to the Present Disclosure)

Figure 4:
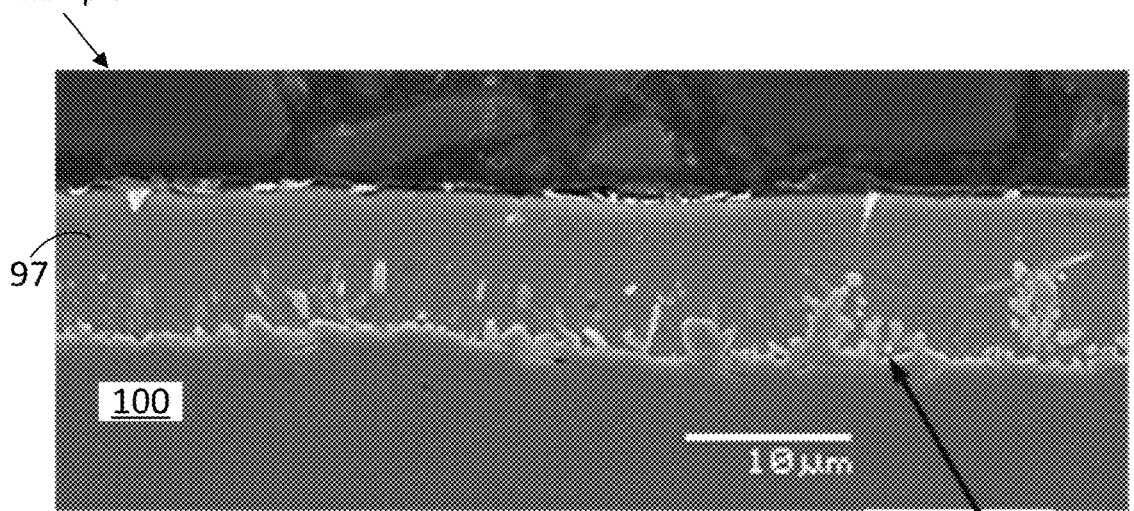
FIG. 4 is a microstructure SEM image of cross-section from a GI coated steel part (not hot press formed) produced in accordance with the present disclosure.

Prior to hot dipping, the press-hardenable steel sheet 100 was annealed in a N$_2$-5% H$_2$ atmosphere at a dew point of −40° C. through a heat cycle with a peak annealing temperature of 580° C. The steel entry temperature (prior to entering into the bath) was 450° C. The steel sheet was then galvanized according to the present invention. The GI coating weight was approximately 60 g/m$^2$. Chemical analysis revealed that the content of bulk Al, Fe and Mn in the GI coating was 0.50 wt. %, 1.66 wt. % and 0.62 wt. %, respectively. However, the addition of manganese made it difficult to form a complete inhibition layer to prevent the formation of Zn—Fe intermetallic compound at the coating/steel interface. As shown in FIG. 4, coating 97 evidenced an incomplete inhibition by the intermetallic compound formed at the coating/steel interface. In effect, a weak and discontinuous inhibition layer is intended by the presently disclosed composition and method in order to facilitate the diffusion between Fe and Zn during the hot forming. The bulk Fe content observed in the presently disclosed GI coating was higher (1.66 wt. %) than in the GI coating of comparative example C1 (0.69 wt. %). Conventionally, a complete inhibition layer could be formed in the coating when the effective Al level in a bath is above 0.15 wt. %, as observed in FIG. 3.

Comparative Example C2—Conventional GI Coating: Press Hardened

Figure 5A:
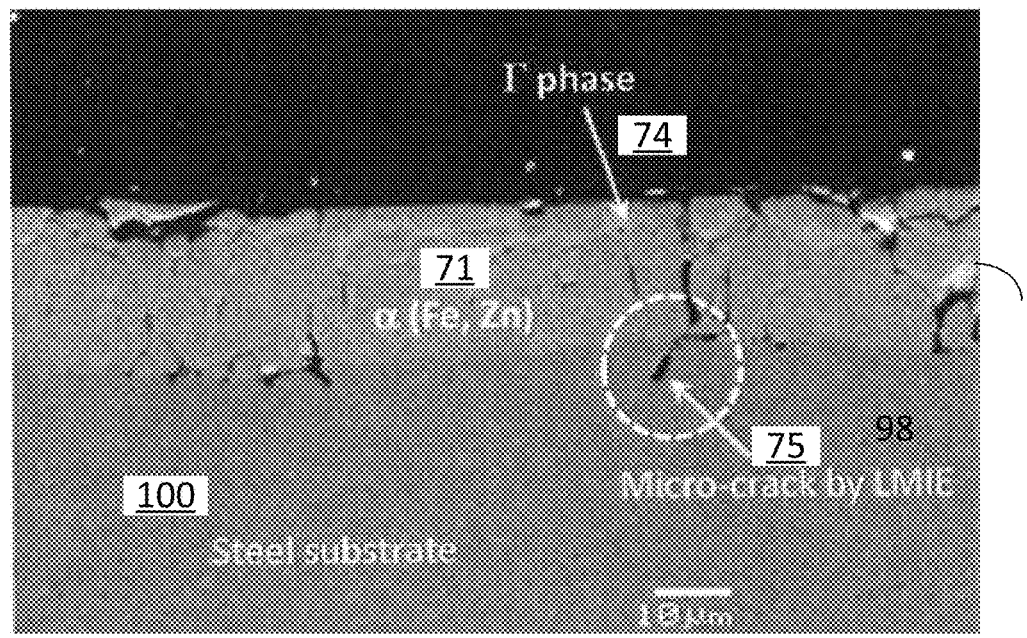
FIG. 5A is a microstructure SEM image of a cross-section from a comparative, GI coated, press-hardened steel part.

FIG. 5A shows the microstructures of a hot press formed GI coating 98 on steel substrate 100 of comparative example C2. In addition to the zinc-containing α (Fe, Zn) 71, the zinc-rich Γ phase 74, which had been a liquid phase prior to solidification, is clearly present in the resultant coating 98. The zinc content was determined to be about 68 wt. % in the Γ phase and 39 wt. % in the α (Fe, Zn) phase, respectively. The presence of the liquid phase in C2 causes liquid metal induced embrittlement (LMIE), which promoted the inception and propagation of micro-cracks in steel substrate 100 as shown in FIG. 5A, where micro-cracking 75 caused by LMIE is also observed in the steel substrate 100.

Figure 5B:
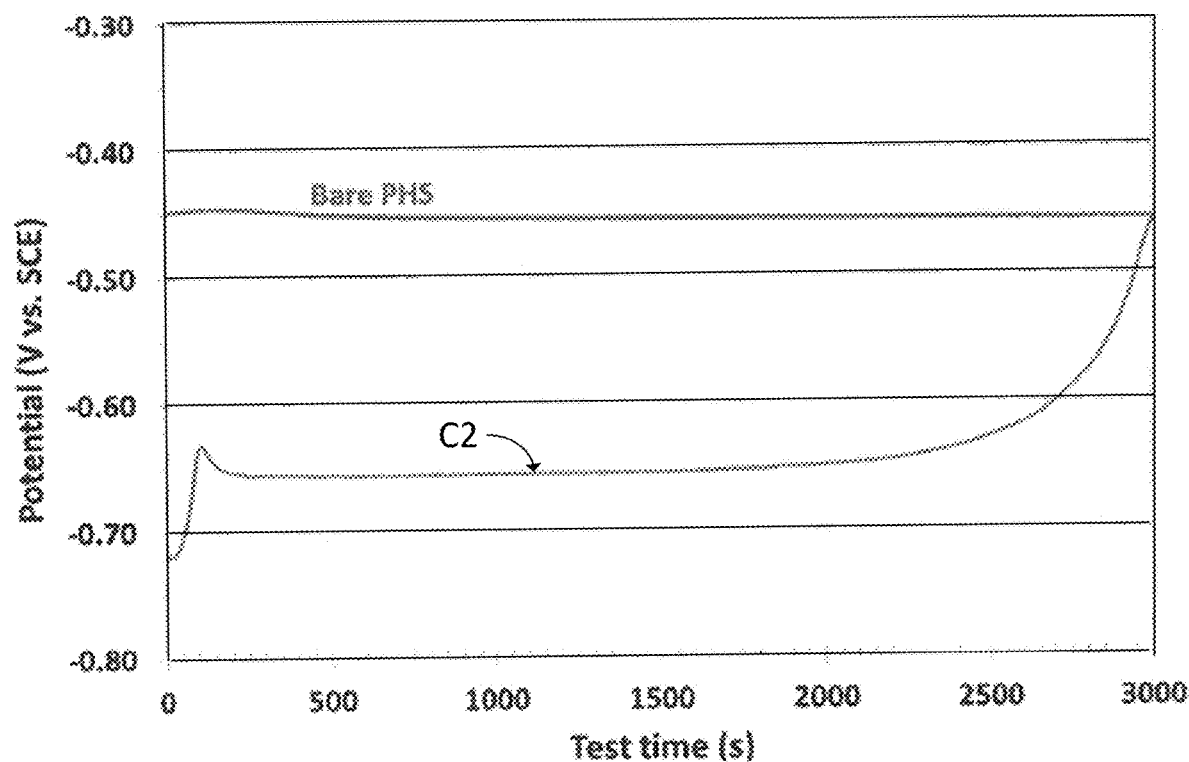
FIG. 5B is a graph depicting the potential evolution of the resultant coating of FIG. 5A as compared to that of bare, press-hardened steel (PHS).

As shown in FIG. 5B, the potential of the comparative coating C2 was initially low and then increased rapidly with test time. This low potential is indicative of the presence of Γ phase having more contained zinc than the α (Fe, Zn) phase. The rapid increase in potential is caused by the exhaustion of the Γ phase and the subsequent onset of the dissolution of α (Fe, Zn). In spite of the increase, the potential remained considerably lower than that of bare PHS. As the dissolution continued to the steel substrate, the potential gradually increased and reached the potential of bare PHS.

Comparative Example C3—After Press Hardening Process

Figure 6A:
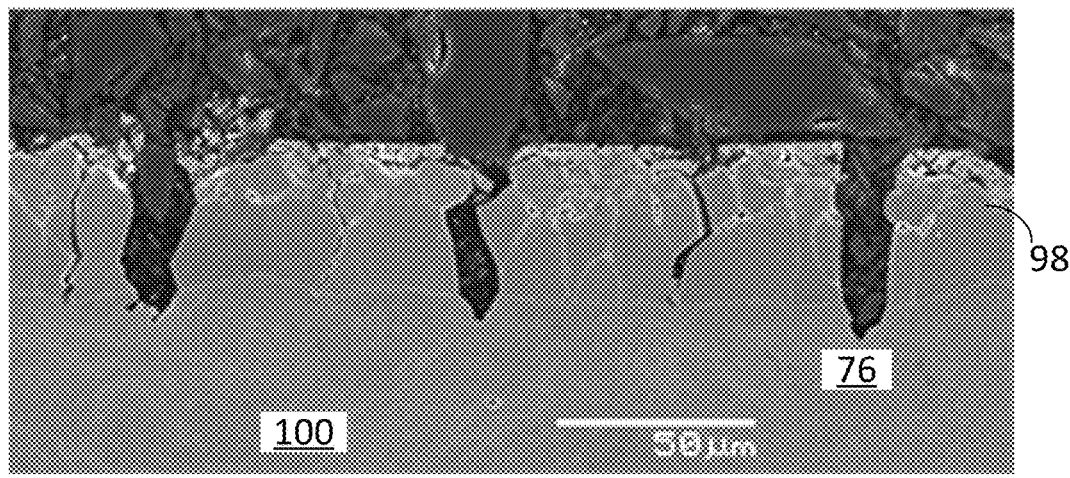
FIG. 6A is a microstructure SEM image of a cross section from a comparative galvanized steel sample after press-hardening process.
Figure 6B:
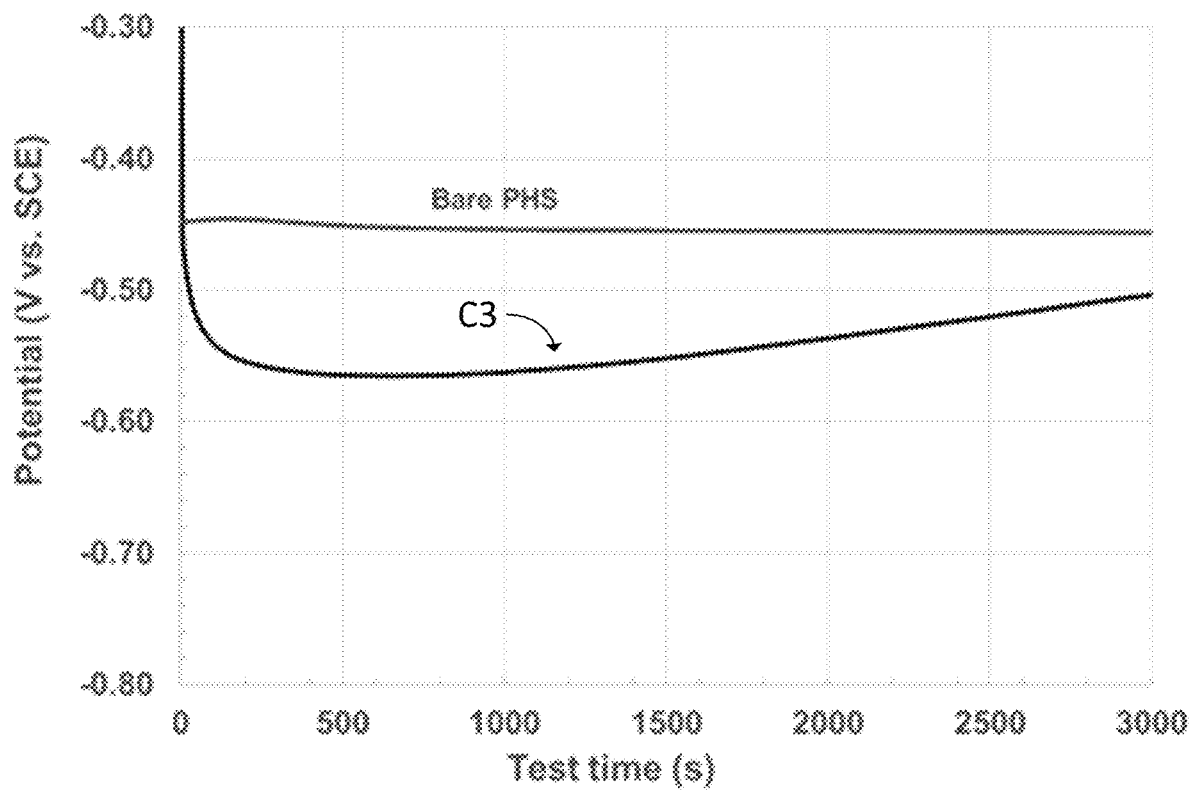
FIG. 6B is a graph depicting the potential evolution of the resultant coating of FIG. 6A as compared to that of bare PHS.

Press-hardenable steel sheet 100 was galvanized with a conventional GI zinc coating under the same conditions as used for Comparative Example C1. The galvanized steel sheet was austenitized in air at 930° C. for 12 min prior to being press hardened as described above for C2. FIG. 6A presents the microstructure of the resultant coating cross sectioned from the hot press formed sample. The average content of zinc in α (Fe, Zn) was approximately 23 wt. %. Substrate cracks 76 caused by LMIE that were deeper than 10 μm were observed, as shown in FIG. 6A. FIG. 6B shows the potential evolution of the resultant coating of comparative example C3 under the same test conditions as described in Comparative Example C2. The potential of the hot press formed GI coating was overall lower than that of bare PHS. As the dissolution proceeded to the steel substrate, the potential of the coating increased and narrowed the difference from the potential of bare PHS.

Comparative Example C4—Galvannealed Coating

Figure 7A:
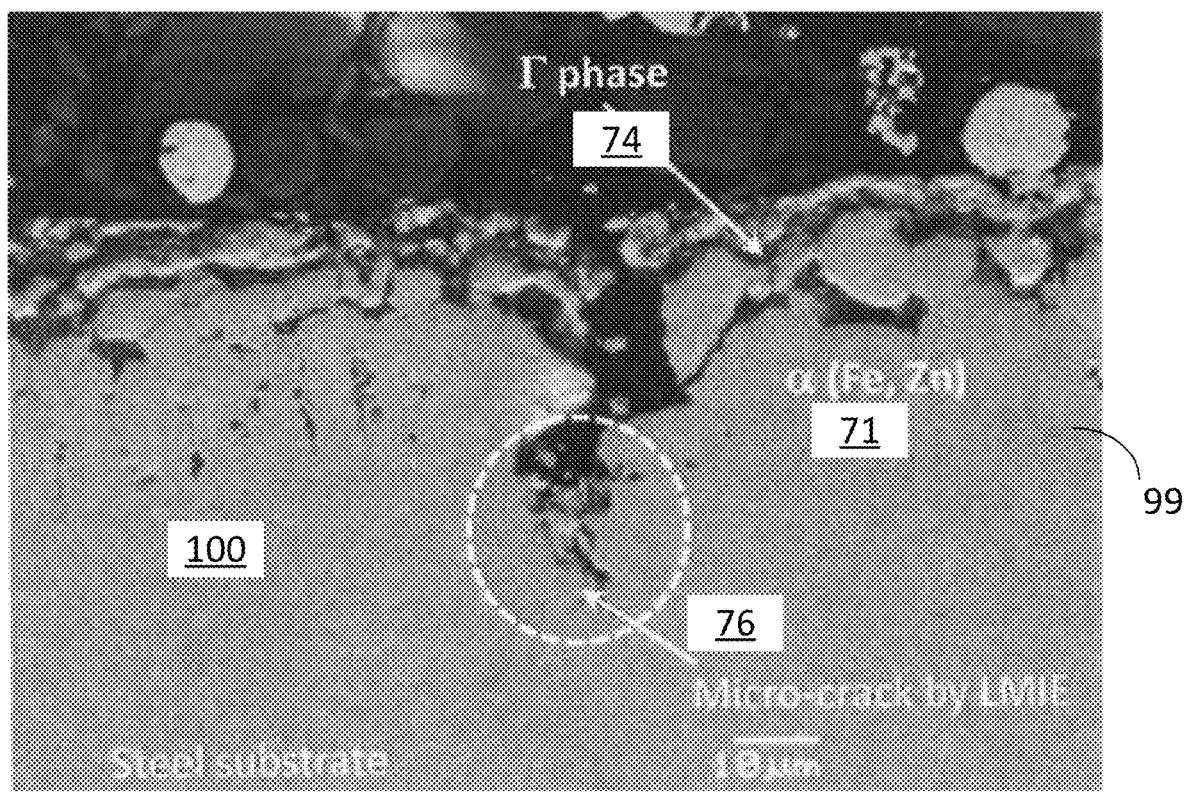
FIG. 7A is a microstructure SEM image of a comparative coating, cross sectioned from a press-hardened GA part.

Press-hardenable steel strip was hot dipped in a zinc bath containing 0.11 wt. % effective Al and then galvannealed (GA) on a CGL under conventional producing conditions. The original GA coating weight was about 80 g/m$^2$. After being austenitized in air at 900° C. for 5 min, the galvannealed PHS sample was immediately press hardened as described above for C1. FIG. 7A shows the microstructure of the hot press formed GA coating 99 on the steel substrate 100 of comparative example C4. Compared to comparative example C2 as shown in FIG. 5A, there was a higher portion of Γ phase 74 in the GA coating of C4 than in the GI coating of C2 after the hot stamping/hot press forming. The Γ phase 74 and α (Fe, Zn) phase 71 in the hot press formed GA coating of comparative example C4 was determined to contain 64 wt. % Zn and 36 wt. % Zn, respectively. The prevalent presence of Γ phase (formerly liquid phase) in the comparative example C4 likely exacerbated the effect of LMIE so that severe micro-cracking in the steel substrate developed.

Figure 7B:
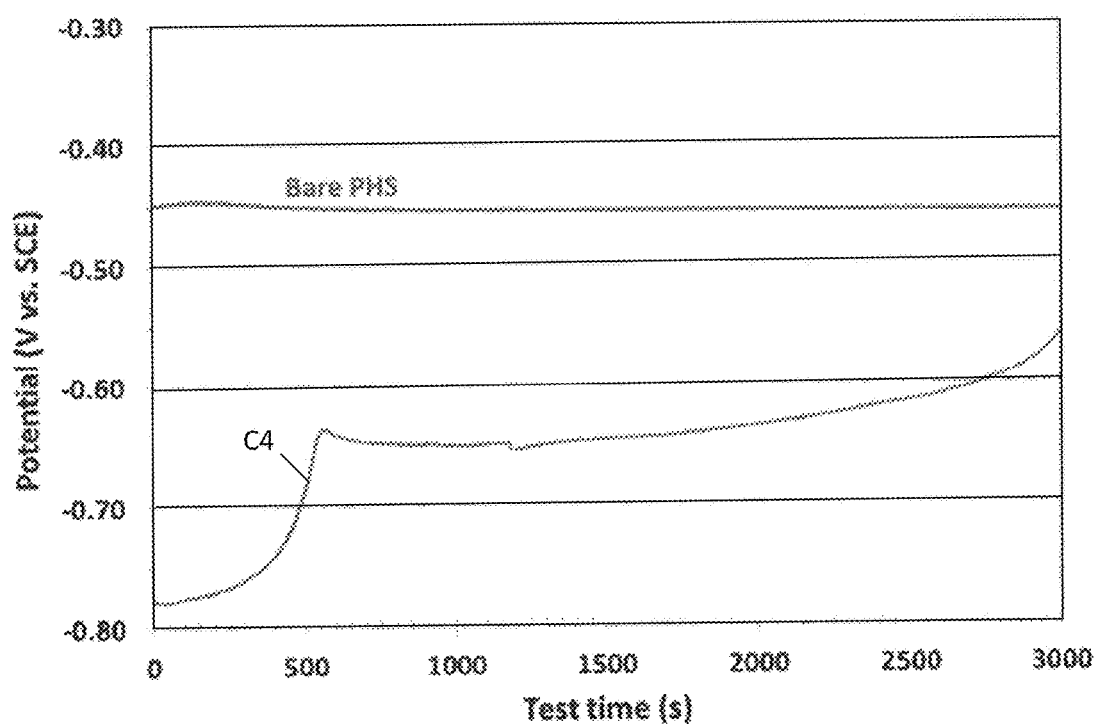
FIG. 7B is a graph depicting the potential evolution of the resultant coating of FIG. 7A as compared to that of bare PHS.

FIG. 7B shows the potential evolution of the resultant galvannealed coating of comparative example C4 under the same test conditions as described in Comparative Example C2. As the test started, the potential of the GA coating remained low for nearly 500 sec, which was longer than the time during which the GI coating exhibited low potentials (FIG. 5B). This confirms a higher portion of Γ phase 74 is present in GA coating 99 than in GI coating 98 after hot stamping/hot press forming. As the dissolution proceeded from the Γ phase 74 to the α (Fe, Zn) 71, the potential of the hot press formed GA coating 99 increased but still stayed significantly lower than that of bare PHS.

Example 2 (According to the Present Disclosure)

Figure 8A:
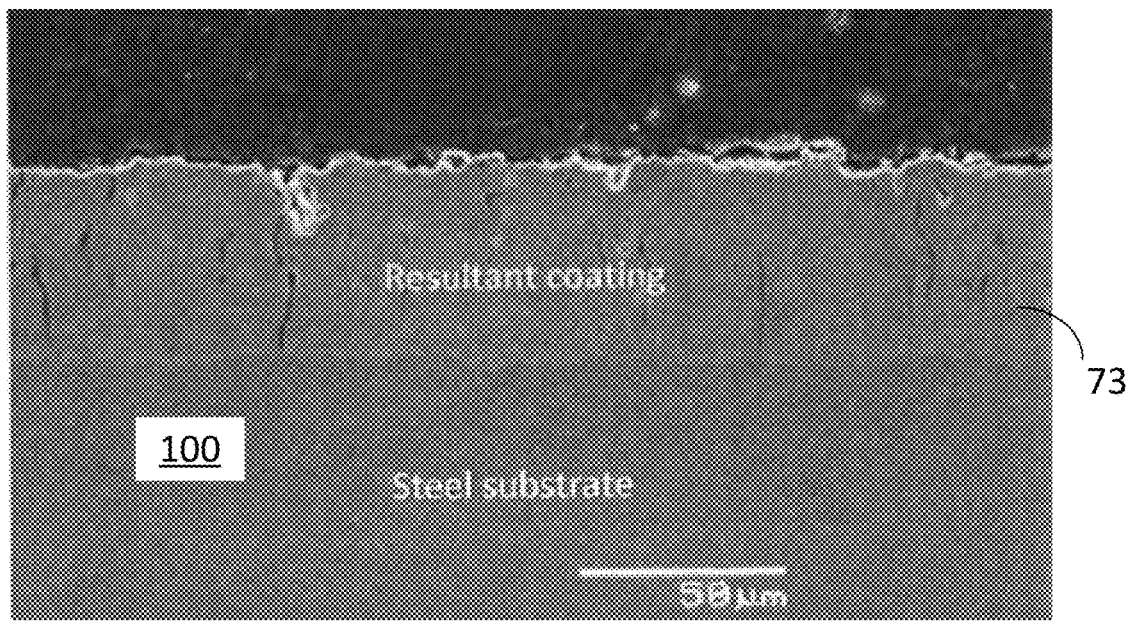
FIG. 8A is a microstructure SEM image of a cross-section from a GI coated press-hardened part in accordance with the present disclosure.

Prior to hot dipping, the press-hardenable steel sheet was optionally annealed through a heat cycle in a $N_2$-5% $H_2$ atmosphere at a dew point of −40° C. The peak annealing temperature was 580° C. The steel sheet was then galvanized in a zinc bath with alloying additions as specified by Formula (I) in the present disclosure. After being austenitized in air at 930° C. for 5 min, the galvanized steel sheet with an original coating weight of about 90 g/m$^2$ was immediately press hardened as described above for C2. As shown in FIG. 8A, the microstructure of the hot press formed coating 73 provided by the presently disclosed bath and coating process was free of the Zn-rich Γ phase (formerly liquid phase) so that the micro-cracking 75 caused by LMIE was eliminated and/or reduced. The zinc content in the α (Fe, Zn) of coating 73 was determined to be about 31 wt. %, which is sufficient to provide effective cathode protection.

Figure 8B:
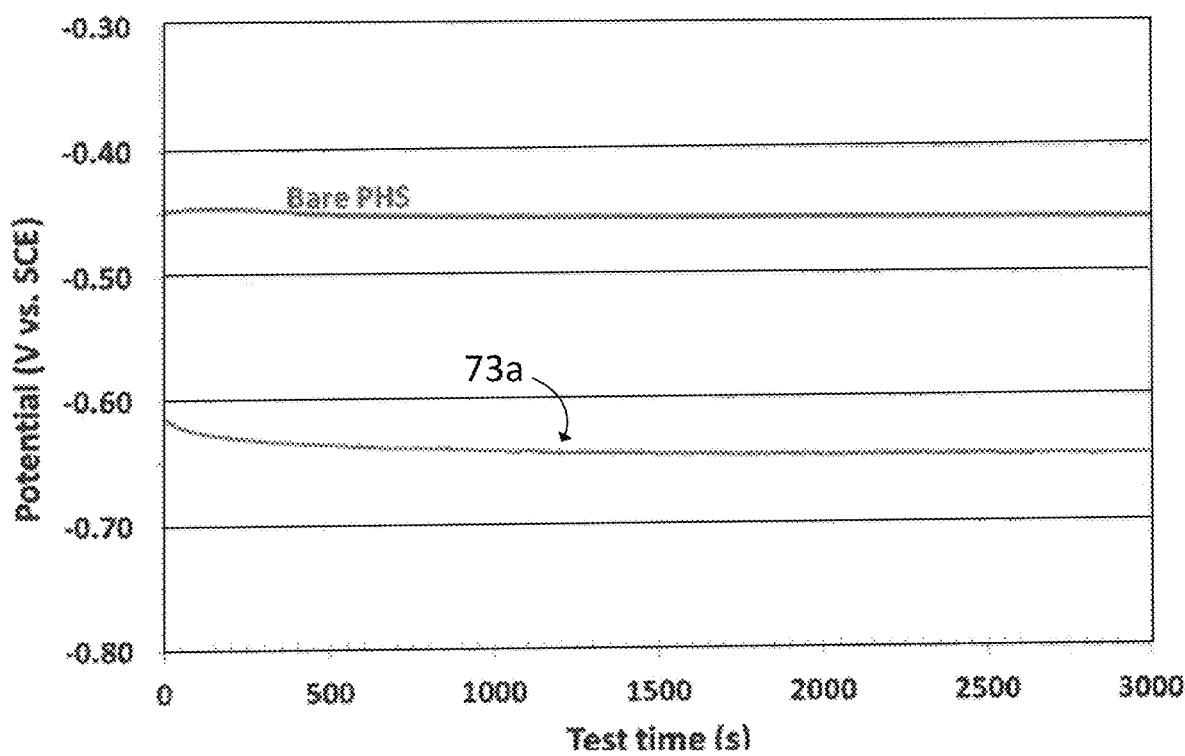
FIG. 8B is a graph depicting the potential evolution of the resultant coating of FIG. 5A as compared to that of bare PHS.

As shown in FIG. 8B, the potential curve 73a of the resultant coating 73 was consistently lower than the potential of bare PHS throughout the entire test. The fact that the potential curve 73a remained stable during the test confirms that the resultant coating consisted mainly of α (Fe, Zn). In contrast, both Comparative Examples C2 and C4 (FIG. 5A and FIG. 7A, respectively) were composed of α (Fe, Zn) and Γ phase. In the examples listed in the U.S. Pat. No. 8,021,497B2, the coatings produced therein also contained a considerable portion of zinc-rich Γ phase, as indicated in the images of the coating microstructures and further supported by the evolution of their potentials provided below the coating micrographs in U.S. Pat. No. 8,021,497B2, all of which were initially low and then sharply increased as the test continued.

Example 3 (According to the Present Disclosure)

Figure 9A:
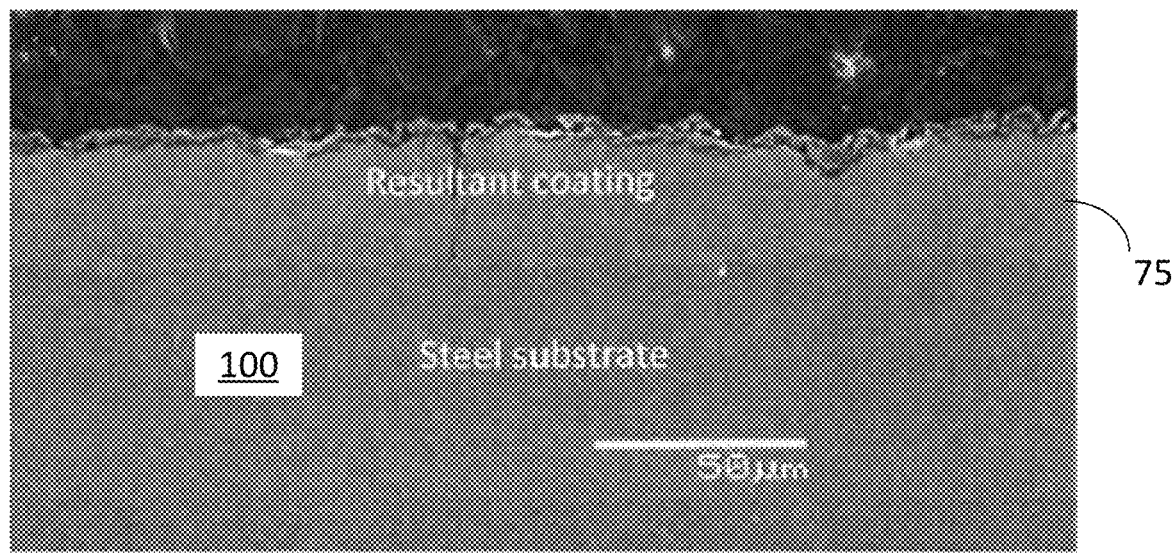
FIG. 9A is a microstructure SEM image of a cross-section coated press hardened part in accordance with the present disclosure.

The press-hardenable steel sheet was galvanized under the same conditions as used for Example 2, but the sheet was austenitized in air at 950° C. for 5 min prior to being press hardened as described above for C2. FIG. 9A presents the microstructure of the hot press formed coating 75. As a result of increased zinc evaporation at a higher austenitization temperature (950° C.), the resultant coating was apparently thinner than the coating in Example 2 (FIG. 8A). The zinc-rich Γ phase was absent in the resultant coating which consisted of α (Fe, Zn) and a surface oxide layer. The zinc content in the α (Fe, Zn) phase was determined to be about 25 wt. %. Example 3 demonstrates that the presently disclosed coating bath and coating process eliminates and/or reduces micro-cracking caused by LMIE in galvanized press hardened PHS.

Figure 9B:
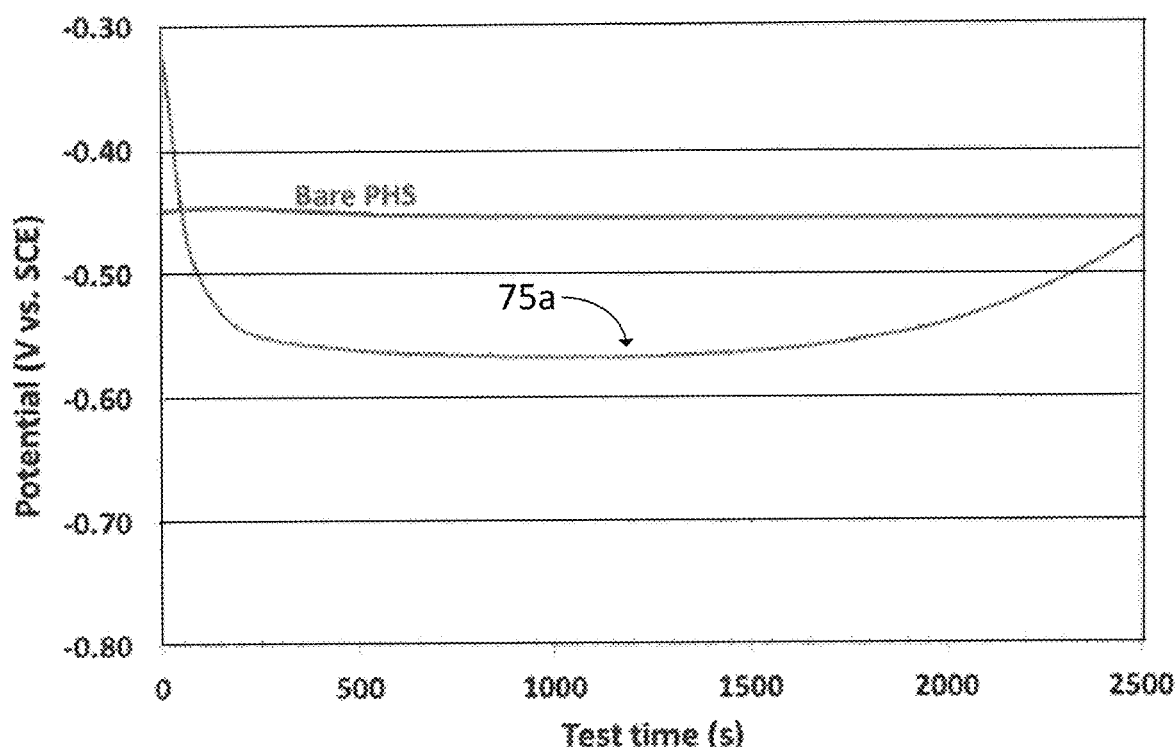
FIG. 9B is a graph depicting the potential evolution of the resultant coating of FIG. 9A as compared to that of bare PHS.

FIG. 9B presents the potential evolution of the resultant coating under the same test conditions. Due to the presence of the surface oxide, the coating potential 75a was initially high but rapidly became lower as the dissolution of the oxide layer was completed. The coating potential 75a then remained lower than that of bare PHS. Thus, FIGS. 9A & 9B representing the presently disclosed coating bath and coating process eliminates and/or reduces micro-cracking caused by LMIE in galvanized press hardened PHS, providing for the capability of cathodic protection to the steel for appreciable time. As the dissolution continued to approach to the steel substrate (test time >2000 s), the potential increased toward the potential of bare PHS.

Example 4 (According to the Present Disclosure)

Figure 10A:
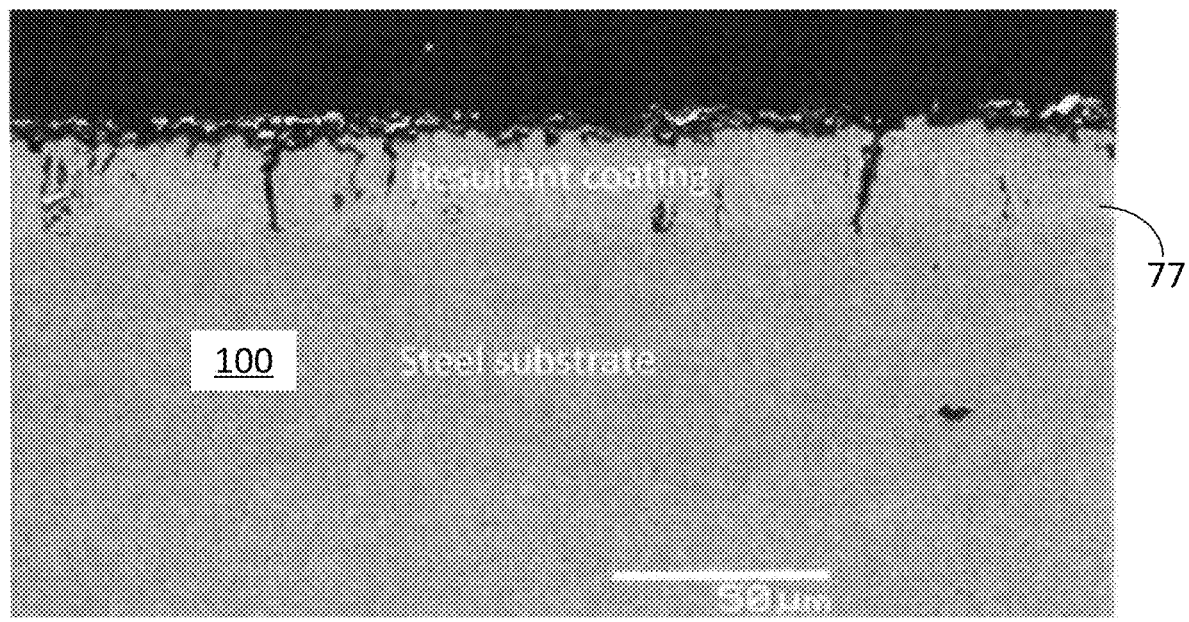
FIG. 10A is a microstructure SEM image of a cross-section from a coated press hardened part in accordance with the present disclosure.
Figure 10B:
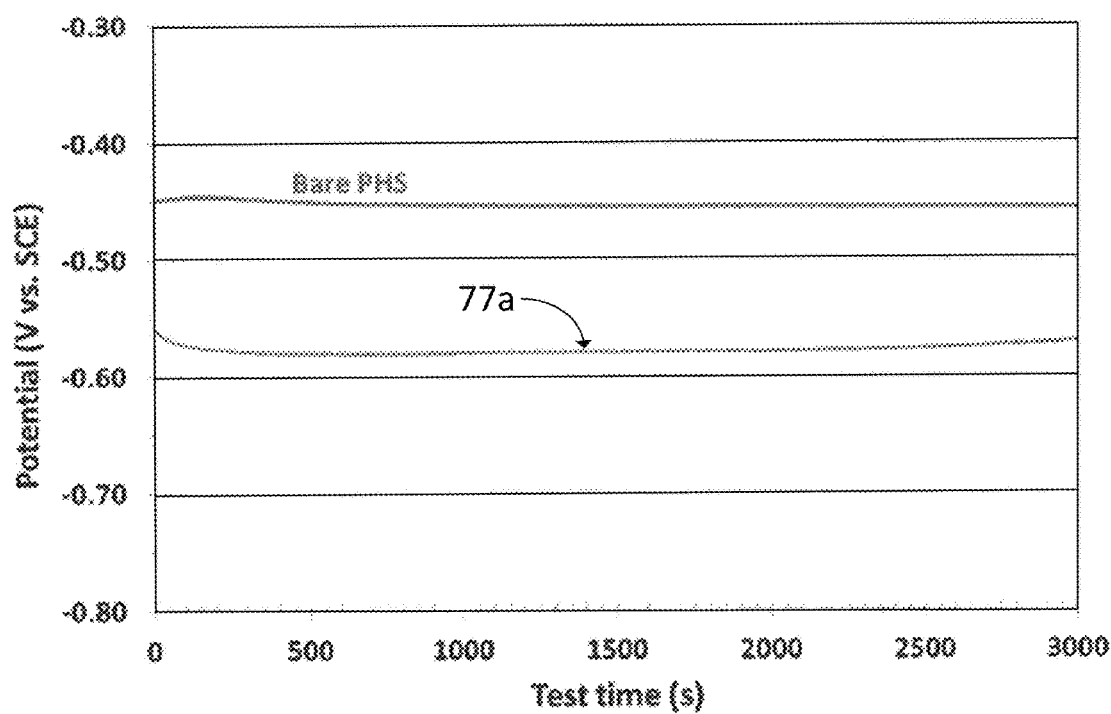
FIG. 10B is a graph depicting the potential evolution of the resultant coating of FIG. 10A as compared to that of bare PHS.

Prior to hot dipping, the press-hardenable steel sheet was annealed in a $N_2$-5% $H_2$ atmosphere at a dew point of −40° C. through a heat cycle with a peak annealing temperature of 716° C. The steel sheet was then galvanized in a bath with alloying additions as specified by Formula (II) in the present disclosure. The original GI coating weight was 90 g/m$^2$. Following an austenitization treatment in air at 950° C. for 5 min the galvanized steel sheet was immediately press hardened as described above for C2. FIG. 10A shows the Γ-free microstructure of the hot press formed coating 77, consisting entirely of α (Fe, Zn). The zinc content in the α (Fe, Zn) phase was determined to be about 25 wt. %. Although coating cracks are evident, steel substrate cracks caused by LMIE were not observed. As shown in FIG. 10B, the coating potential 77a of the resultant coating was lower than that of bare PHS. Thus, coating 77 was sufficient to provide cathodic protection to the steel and demonstrates that the presently disclosed coating bath and coating process eliminates and/or reduces micro-cracking of the steel substrate caused by LMIE in press hardened, galvanized PHS.

Example 5 (According to the Present Disclosure—Galvannealed)

Figure 11A:
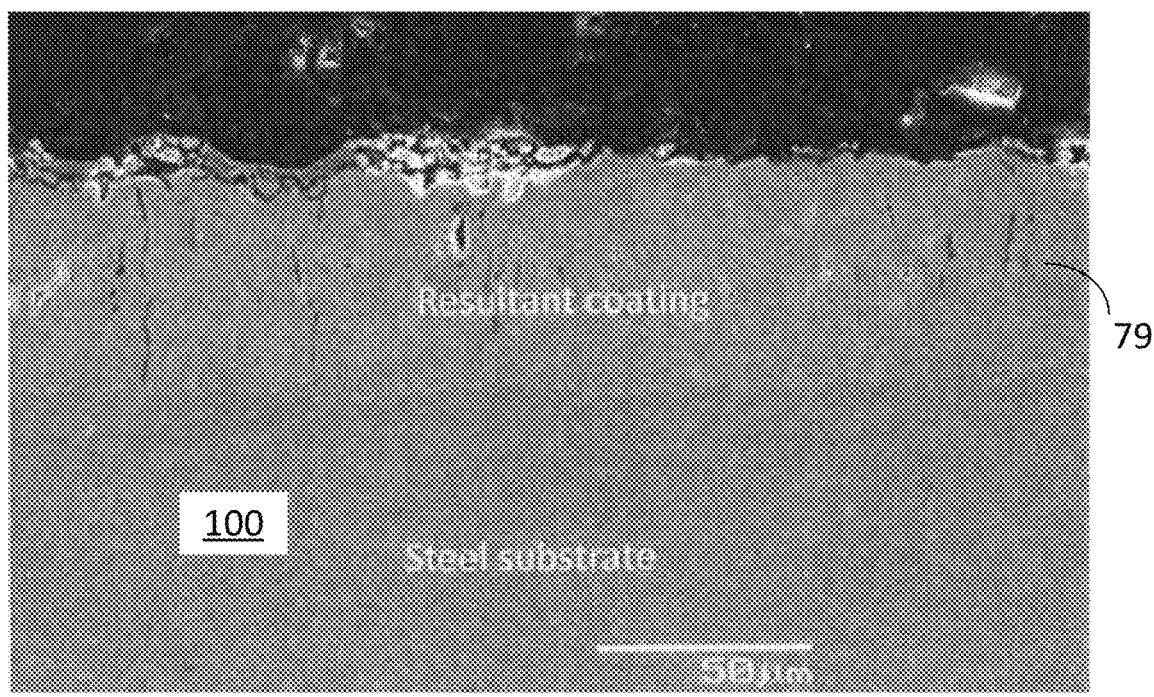
FIG. 11A is a microstructure SEM image of a cross-section from a coated press hardened part in accordance with the present disclosure.
Figure 11B:
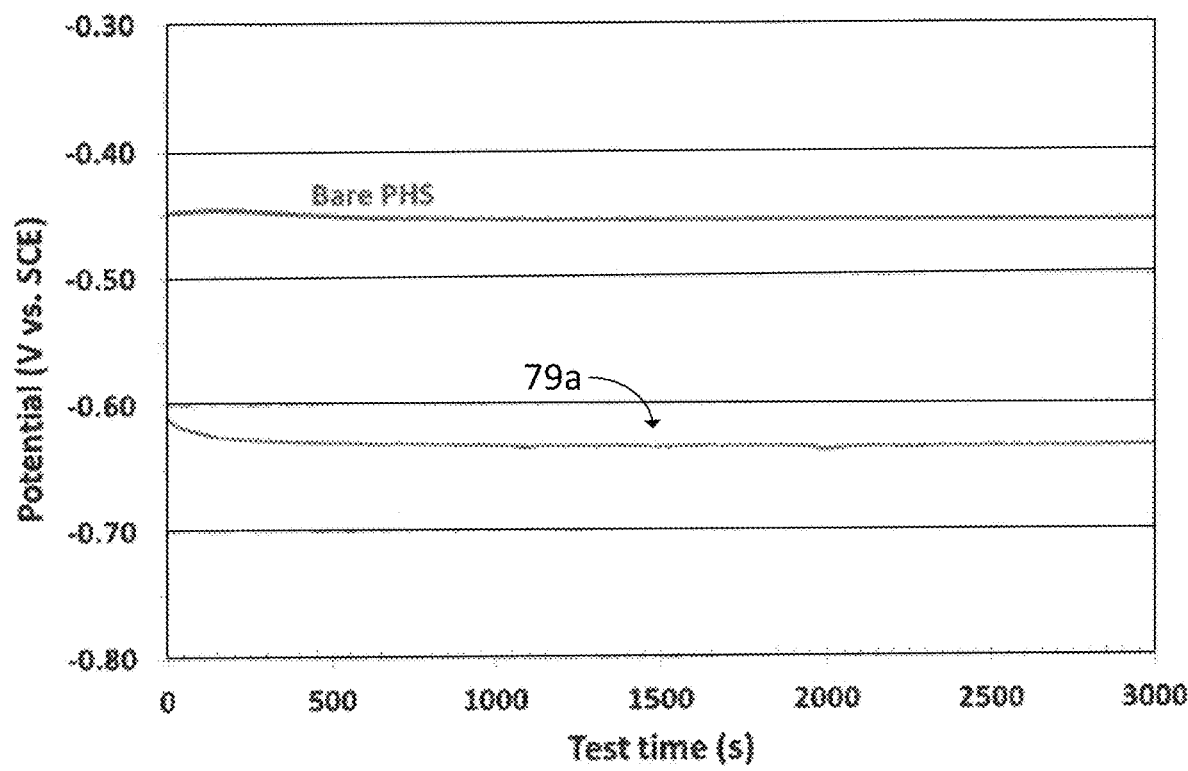
FIG. 11B is a graph depicting the potential evolution of the resultant coating of FIG. 11A as compared to that of bare PHS.

In this example, the press-hardenable steel sheet was annealed and hot dipped under the same conditions as in Example 4, but the hot-dipped steel sheet was subsequently galvannealed (GA) at 550° C. for 10 sec. The original GA coating weight was 120 g/m$^2$. After being austenitized in air at 930° C. for 5 min, the galvannealed steel sheet was immediately press hardened as described above for C2. The resultant coating 79 consisted mainly of α (Fe, Zn) 71 and a layer of surface oxide, which was mostly peeled off after hot stamping/hot press forming The zinc content in the α (Fe, Zn) phase was determined to be 30%. FIG. 11A indicates the zinc-rich Γ phase was absent in coating 79. As shown in FIG. 11B, the coating potential 79a of coating 79 was consistently lower than that of bare PHS throughout the entire test. Coating 79 demonstrates that the presently disclosed coating bath and coating process eliminates and/or reduces micro-cracking caused by LMIE in press hardened, galvannealed PHS.

Example 6 (According to the Present Disclosure—Galvannealed)

Figure 12A:
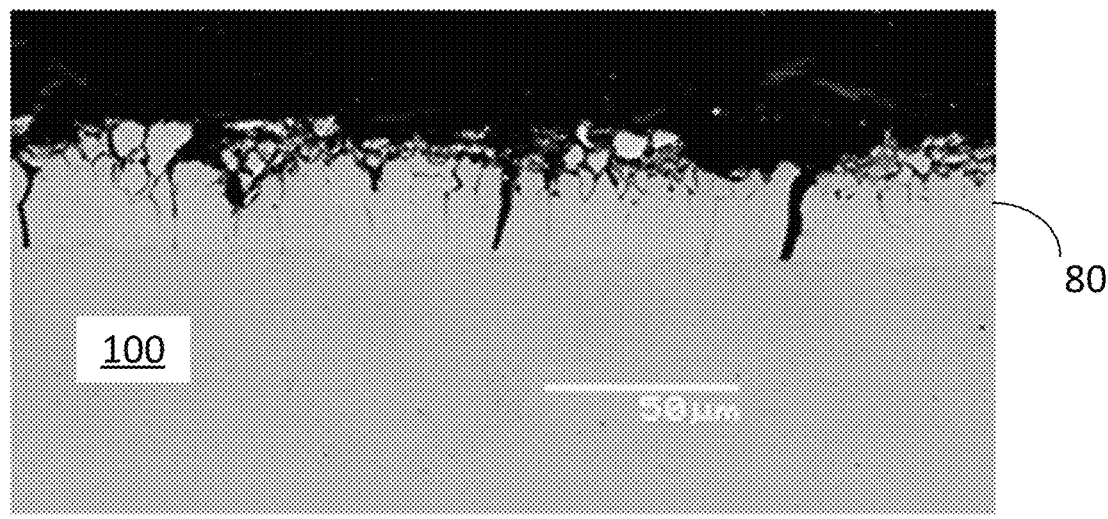
FIG. 12A is a microstructure SEM image of a resultant coating cross sectioned from a press-hardened galvanized steel sample in accordance with the present disclosure.
Figure 12B:
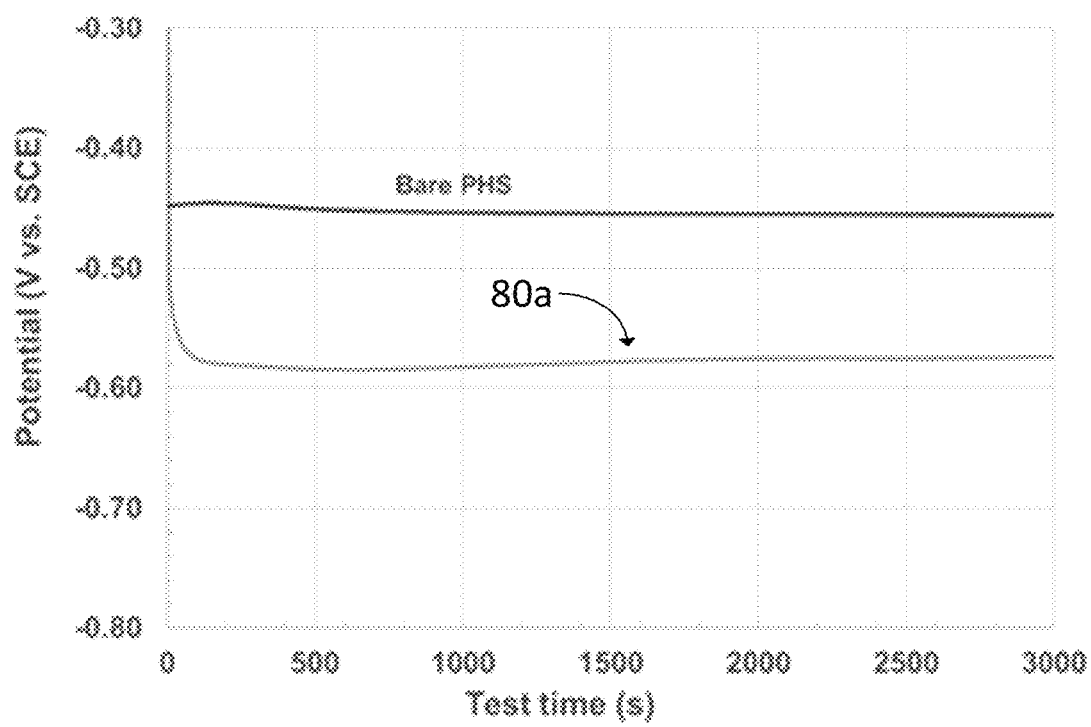
FIG. 12B is a graph depicting the potential evolution of the resultant coating of FIG. 12A as compared to that of bare PHS.

Press-hardenable steel sheet was galvanized under the same conditions as used for Example 1. The hot-dipped steel sheet was subsequently galvannealed (GA) at 520° C. for about 10 sec. The original GA coating weight was about 70 g/m². After being austenitized in air at 930° C. for 6 min, the GA steel sheet was press hardened as described above for C2. As shown in FIG. 12A, the zinc-rich Γ was absent in the resultant coating 80 which consisted mainly of α (Fe, Zn) and a surface oxide layer. In this example, no substrate micro-cracks were observed. The zinc content in the α (Fe, Zn) phase was measured to be 25 wt. %. As shown in FIG. 12B, the coating potential was consistently lower than the potential of bare PHS throughout the test, demonstrating a higher potency for cathodic protection than Comparative Example C3 (FIG. 6B).

Comparative Example C5—Galvanized Coating Prepared in a Mn-Containing Bath

Figure 13A:
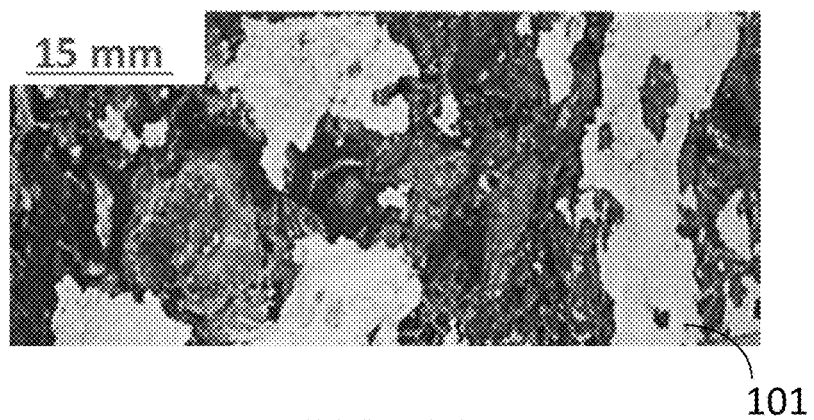
FIG. 13A is a surface image of a portion of a press-hardened GI part with original coating produced from a bath different from the present disclosure.
Figure 13B:
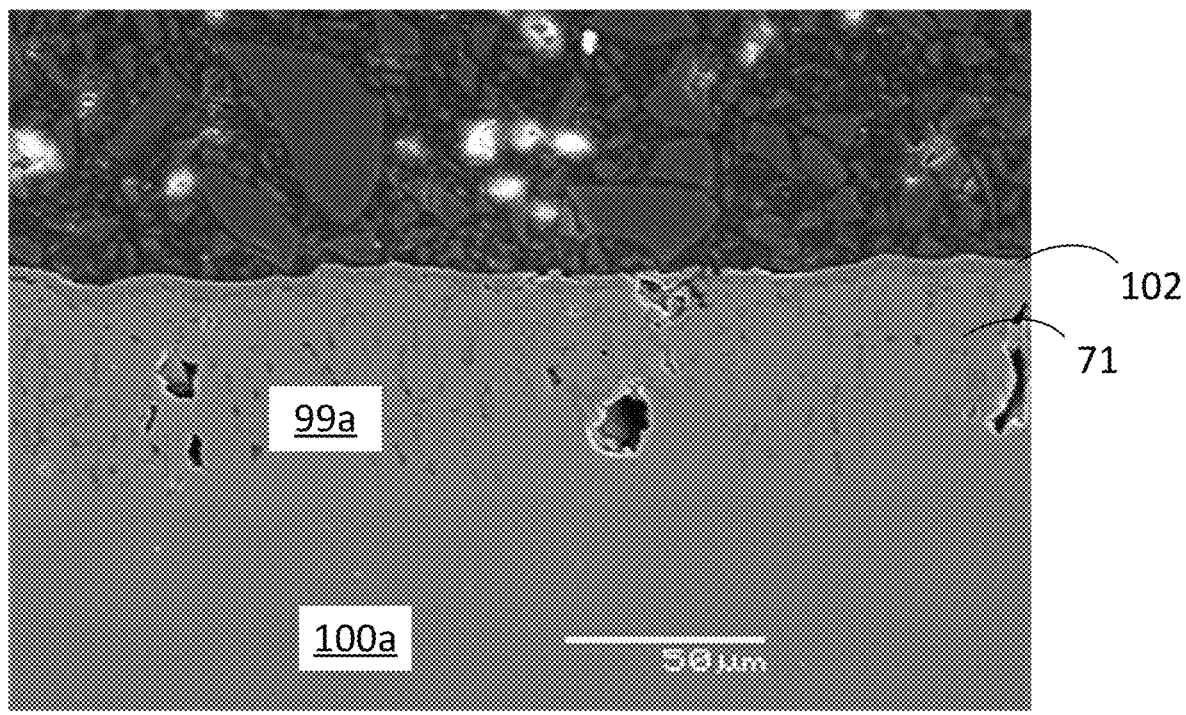
FIG. 13B is a microstructure SEM image of a comparative coating cross sectioned from the press-hardened GI part in FIG. 13A.

In this example, the steel sheet was galvanized in a zinc bath containing 0.11 wt. % Al and 0.64 wt. % Mn. This bath chemistry is outside the presently disclosed bath chemistry ranges, in accordance with Formula (I) (i.e. 0.1+Mn (wt. %)/30≤Al≤0.3+Mn (wt. %)/20). The coating produced from the Comparative Example C3 bath was overly thick with a coating weight of about 390 g/m². The galvanized steel sheet of the Comparative Example C5 was austenitized in air at 920° C. for 5 min and was subsequently press hardened as described above for C2. Severe oxidation occurred on the press hardened part of the Comparative Example C5, resulting in the formation of excessive ZnO. FIG. 13A shows the surface image of a portion of the press-hardened part of the Comparative Example C5. White oxide 101 (ZnO) which was fluffy and readily flaked off the surface. FIG. 13B shows the microstructure of the resultant coating cross sectioned from the press-hardened GI part of the Comparative Example C5. Elemental analysis revealed the coating of Comparative Example C5 consisted mostly of α (Fe, Zn) with an oxide layer comprising mainly iron oxide (the top zinc oxide had been removed). Due to the loss of zinc caused by excessive oxidation, the zinc content in the α (Fe, Zn) was quite low, only about 16 wt. % in the Comparative Example C5.

Figure 14:
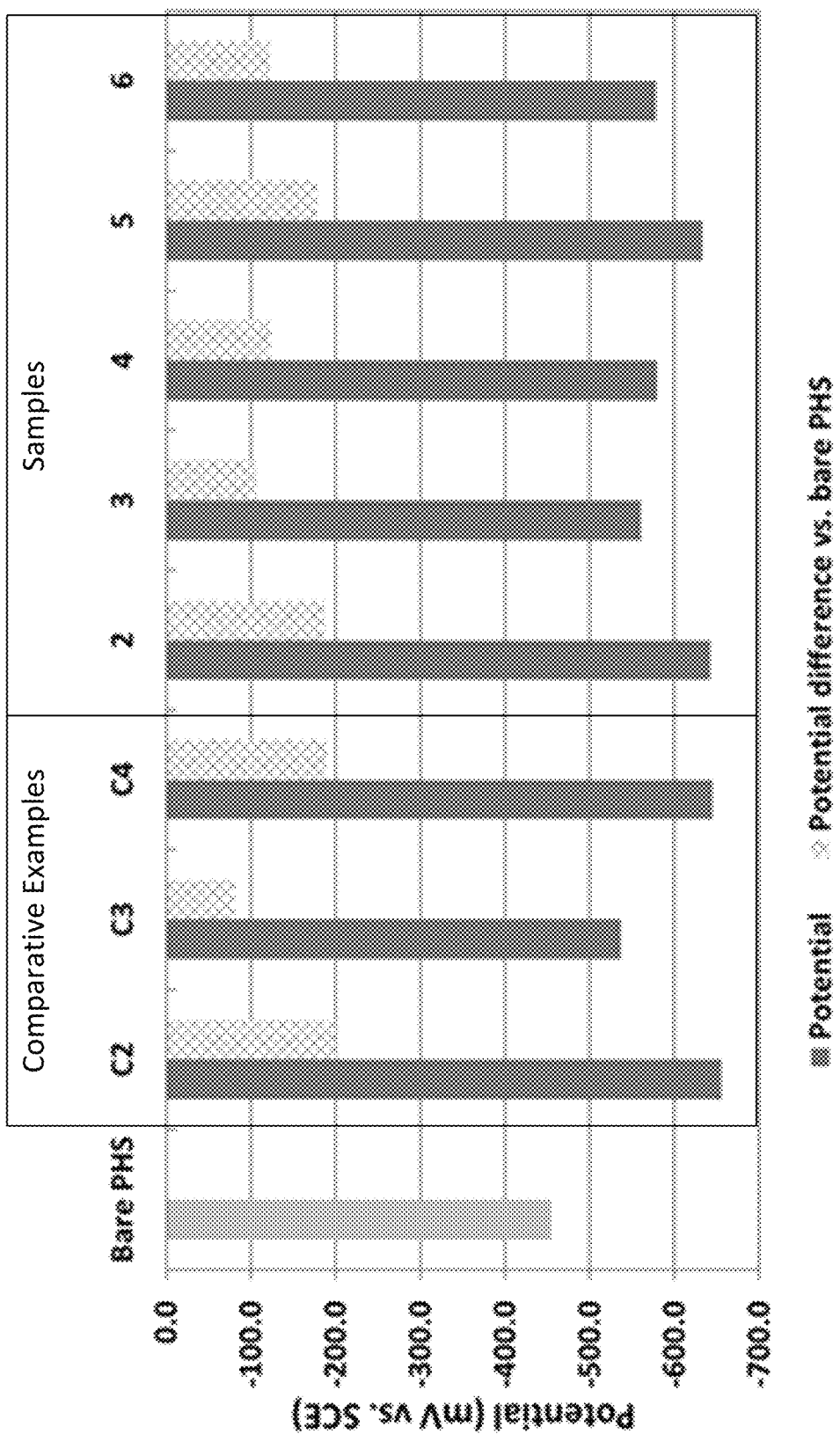
FIG. 14 is a bar-chart representation of potentials of α(Fe, Zn) in the comparative examples and the various hot press formed coated samples prepared in accordance with the present disclosure, in comparison to the potential of bare PHS.

When the post press hardened coating consists mostly of α (Fe, Zn), the coating's potential is strongly affected by the zinc content in the α (Fe, Zn) phase. The coating's potential tends to be lower as the zinc content increases, thereby increasing the potential difference from bare PHS. To maximize the effectiveness of cathodic protection, a cathodic protection amount of zinc content in the α (Fe, Zn) phase is provided by the present composition and methods. In one aspect, the present disclosure provides for above 18 wt. %, above 19 wt. %, above 20% wt., above 21 wt. %, or above 22 wt. % of zinc content in the α (Fe, Zn) phase of the post press hardened coating to provide an effective amount of cathodic protection. In another aspect, the present disclosure provides for above 20 wt. % of zinc content in the α (Fe, Zn) phase of the post press hardened coating to provide an effective amount of cathodic protection FIG. 14 depicts a summary of the post press hardened coating potentials of Comparative Examples C2, C3, and C4, and the presently disclosed press hardened samples 2, 3, 4, 5, and 6, compared to the potential of bare PHS. According to U.S. Pat. No. 8,021,497B2, a potential difference target of 100 mV (measured as the difference from bare PHS) can be taken as a minimum requirement for cathodic protection. All of the presently disclosed examples had a potential difference of at least 100 mV that sufficiently provided cathodic protection to the steel substrate. Notably, Examples 2 and 5 exhibited a potential difference close to 200 mV. Comparative Examples C2, and C4, produced under conventional conditions, had potential differences nearly the same as those of Examples 2 and 5. The potential difference of Comparative Example C3 was smaller than 100 mV, which is insufficient for effective cathodic protection. Although the potential of α (Fe, Zn) varied from coating to coating, all of the presently disclosed coatings were lower than that of bare PHS and thus are capable of providing post press-hardened cathodic protection for a steel substrate.

The term "about", unless otherwise defined herein, is intended to include an upper and lower range of 10% of the stated value. Thus, "about 100," for example, would include a range of 90 to 110 inclusive of the endpoints.

Although the present disclosure has been shown and described in detail with regard to only a few exemplary embodiments of the disclosure, it should be understood by those skilled in the art that it is not intended to limit the disclosure to specific embodiments disclosed. Various modifications, omissions, and additions may be made to the disclosed embodiments without materially departing from the novel teachings and advantages of the disclosure, particularly in light of the foregoing teachings. Accordingly, it is intended to cover all such modifications, omissions, additions, and equivalents as may be included within the scope of the disclosure as defined by the following claims.

We claim:

1. A press hardened steel sheet article comprising a galvanized corrosion-protection layer, the galvanized corrosion-protection layer comprising iron; aluminum; manganese (Mn); and a remainder of zinc; wherein the galvanized corrosion-protection layer comprises an iron-based phase containing zinc (α (Fe, Zn)) absent a zinc-rich Γ phase, wherein the galvanized corrosion-protection layer comprises an amount of zinc in the α (Fe, Zn) phase of at least 18 weight percent zinc.

2. The press hardened steel sheet article of claim 1, wherein the corrosion-protection coating comprises an amount of zinc in the α (Fe, Zn) phase of at least 19 weight percent.

3. The press hardened steel sheet article of claim 1, wherein the corrosion-protection coating comprises an amount of zinc in the α (Fe, Zn) phase of at least 20 weight percent.

4. The press hardened steel sheet article of claim 1, wherein the corrosion-protection coating comprises an amount of zinc in the α (Fe, Zn) phase of at least 21 weight percent.

5. The press hardened steel sheet article of claim 1, wherein the corrosion-protection coating comprises an amount of zinc in the α (Fe, Zn) phase of at least 22 weight percent.

6. The press hardened steel sheet article of claim 1, wherein the steel article comprises boron.

7. The press hardened steel sheet article of claim 1, wherein the steel article comprises no intentionally added boron.

8. A method for producing the press hardened steel sheet article of claim 1, the method comprising the steps of:
  (i) contacting a hardenable steel sheet alloy article with a coating, the coating comprising zinc, aluminum, manganese (Mn), and a remainder of zinc, so as to provide a coated hardenable steel alloy;
  (ii) heating, at least a portion of the coated hardenable steel sheet alloy article, to a temperature necessary for press hardening;
  (iii) press hardening the coated hardenable steel alloy article;
  (iv) cooling the coated hardenable steel sheet alloy article after the step (iii), and
  providing a cathodic protection amount of zinc content in an $\alpha$(Fe, Zn) phase to the coated hardenable steel sheet alloy article absent a zinc-rich $\Gamma$ phase, wherein the galvanized corrosion-protection layer comprises an amount of zinc in the $\alpha$ (Fe, Zn) phase of at least 18 weight percent zinc.

9. The method of claim 8, wherein the contacting step (i) provides a sheet-coating interface, wherein formation of a Al-rich inhibition layer at the sheet-coating interface is avoided or eliminated.

10. The method of claim 8, wherein Mn facilitates Fe-Zn diffusion during the step (iii).

11. The method of claim 8, wherein a Al-rich inhibition layer is reduced or eliminated at the sheet-coating interface during the press hardening step (iii).

12. The method of claim 8, further comprising, following the step (iii), a reheating step so as to promote pre-alloying of the post press hardened coating with the press hardenable steel sheet alloy article.

13. The method of claim 12, wherein the reheating step is performed using a galvannealing temperature of between about 480° C. and about 600° C., with a holding time from 2 to 20 seconds.

14. The method of claim 13, wherein the reheating is performed using a galvannealing temperature of between about 520° C. and about 580° C., with a holding time from 5 to 20 seconds.

15. The method of claim 8, wherein, during the step (ii) and prior to step (iii), zinc evaporation is suppressed and a liquid phase of zinc in the coating is fast diffusion of the zinc into the hardenable steel sheet alloy article.

* * * * *

UNITED STATES PATENT AND TRADEMARK OFFICE
CERTIFICATE OF CORRECTION

| | |
|---|---|
| PATENT NO. | : 11,913,118 B2 |
| APPLICATION NO. | : 16/462883 |
| DATED | : February 27, 2024 |
| INVENTOR(S) | : Weiping Sun, Nan Gao and Yihui Liu |

Page 1 of 1

It is certified that error appears in the above-identified patent and that said Letters Patent is hereby corrected as shown below:

In the Claims

In Column 22, Claim 15, please change Line 23 to:
liquid phase of zinc in the coating is minimized by diffusion of the zinc Signed and Sealed this
Second Day of July, 2024

*Katherine Kelly Vidal*

Katherine Kelly Vidal
*Director of the United States Patent and Trademark Office*